(12) United States Patent
Zhang et al.

(10) Patent No.: US 10,097,828 B2
(45) Date of Patent: Oct. 9, 2018

(54) RATE CONTROL FOR PARALLEL VIDEO ENCODING

(71) Applicant: Intel Corporation, Santa Clara, CA (US)

(72) Inventors: Ximin Zhang, San Jose, CA (US); Sang-Hee Lee, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 386 days.

(21) Appl. No.: 14/567,600

(22) Filed: Dec. 11, 2014

(65) Prior Publication Data

US 2016/0173875 A1     Jun. 16, 2016

(51) Int. Cl.
| | |
|---|---|
| *H04N 19/124* | (2014.01) |
| *H04N 19/152* | (2014.01) |
| *H04N 19/172* | (2014.01) |
| *H04N 19/436* | (2014.01) |
| *H04N 19/15* | (2014.01) |
| *H04N 19/115* | (2014.01) |

(52) U.S. Cl.
CPC ......... *H04N 19/124* (2014.11); *H04N 19/115* (2014.11); *H04N 19/15* (2014.11); *H04N 19/152* (2014.11); *H04N 19/172* (2014.11); *H04N 19/436* (2014.11)

(58) Field of Classification Search
CPC .... H04N 19/124; H04N 19/115; H04N 19/15; H04N 19/152; H04N 19/172; H04N 19/436
USPC .................................................... 375/240.03
See application file for complete search history.

(56) References Cited

U.S. PATENT DOCUMENTS

| | | | | |
|---|---|---|---|---|
| 8,126,283 | B1* | 2/2012 | Garbacea | ............ G06F 17/3079 |
| | | | | 375/240 |
| 2004/0233998 | A1 | 11/2004 | Wu et al. | |
| 2006/0126728 | A1 | 6/2006 | Yu et al. | |

(Continued)

FOREIGN PATENT DOCUMENTS

| | | |
|---|---|---|
| EP | 0899961 | 3/1999 |
| EP | 2328351 | 6/2011 |
| WO | 2013133522 | 9/2013 |

OTHER PUBLICATIONS

International Search Report & Written Opinion dated Feb. 18, 2016 for PCT Patent Application No. PCT/US15/59709.

(Continued)

*Primary Examiner* — Jamie Atala
*Assistant Examiner* — Ayman Abaza
(74) *Attorney, Agent, or Firm* — Green, Howard, & Mughal LLP

(57) ABSTRACT

Systems and methods for determining a target number of bits (target bitrate) for encoding a frame of video that will satisfy a buffer constraint in a parallel video encoder. The quantization parameter (QP) for a given encoding process may be determined for the frame based on the target bitrate to maintain a suitable average bitrate. In some embodiments, the bitrate used for one or more prior frame is estimated. In some embodiments, a buffer fullness update is made based on an estimated bitrate. In some embodiments, a bitrate to target for each frame is determined based on the frame type, estimated bitrate of a prior frame(s), and the updated buffer fullness.

20 Claims, 13 Drawing Sheets

(56) References Cited

U.S. PATENT DOCUMENTS

| | | | |
|---|---|---|---|
| 2006/0256869 A1* | 11/2006 | Chin | H04N 19/172 375/240.24 |
| 2008/0159408 A1* | 7/2008 | Degtyarenko | H04N 19/159 375/240.25 |
| 2009/0219991 A1* | 9/2009 | Po | H04N 19/176 375/240.02 |
| 2011/0051806 A1* | 3/2011 | Lee | H04N 19/159 375/240.03 |
| 2012/0140816 A1 | 6/2012 | Franche et al. | |
| 2014/0241420 A1 | 8/2014 | Orton-Jay et al. | |
| 2015/0023413 A1* | 1/2015 | Jung | H04N 19/176 375/240.03 |

OTHER PUBLICATIONS

International Preliminary Report on Patentability for International Patent Application No. PCT/US2015/059709, dated Jun. 22, 2017.
Search Report for European Patent Application No. 158676693.2, dated May 22, 2018.

* cited by examiner

RATE CONTROL FOR PARALLEL VIDEO ENCODING

BACKGROUND

Visual quality is an important aspect of the user experience in many media applications. In media compression/decompression (codec) systems, visual quality may be primarily based on the compression format used. A video encoder compresses video information so that more information can be sent over a given bandwidth or stored in a given memory space, etc. The compressed signal or data may then be decoded via a decoder that decodes or decompresses the signal or data for display to a user.

Standardized codecs, such as H.264/MPEG-4 Advanced Video Coding (AVC) standard, the High Efficiency Video Coding (HEVC) standard, and VP8(RF36386)/VP9, ensure that all standard compliant decoders will be able to decode standard compliant compressed video. Standardized codecs define a receiver model called hypothetical reference decoder (HRD). To be standard compliant, an encoder must create a bitstream that is decodable by the HRD. The HRD specifies one or more buffer, such as a coded picture buffer (CPB), and decoded picture buffer (DPB). The HRD may employ a leaky bucket model parameterized by transmission bitrate, buffer size, and initial decoder buffer fullness. Buffering is employed at the encoder and decoder side to accommodate the bitrate variation of the compressed video when transmitting video data at a constant or nearly constant bitrate. Bitrate variation is a result of the number of bits needed to compress a given video frame varying, for example as a function of frame type (e.g., intra- or inter-coded).

Transform coefficients obtained via an encoding technique may be quantized as a function of the quantization parameter (QP). A larger QP value results in greater compression at the cost of lower quality, while lower QP values achieve greater visual quality at the cost of a reduced compression rate. QP may be modulated for a given frame to control the number of generated bits (i.e., frame size) as means of rate control to meet the HRD buffer constraint. Typically, a rate control module responsible for determining a QP value for a given frame needs the number of bits used by the previous encoded frame to control the encoding process of a current frame such that a target bitrate is met and the buffer constraint satisfied.

With the complexity of video codecs continuing to increase, parallel processing is becoming more important in video encoding applications. However, with parallel encoding architectures the number of bits used by the prior encoded frame may not be available to the rate control module responsible for determining a QP value for the subsequently encoded frame. As such, parallel video encoder rate control techniques and systems capable of performing such techniques are advantageous in the market place.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1A:
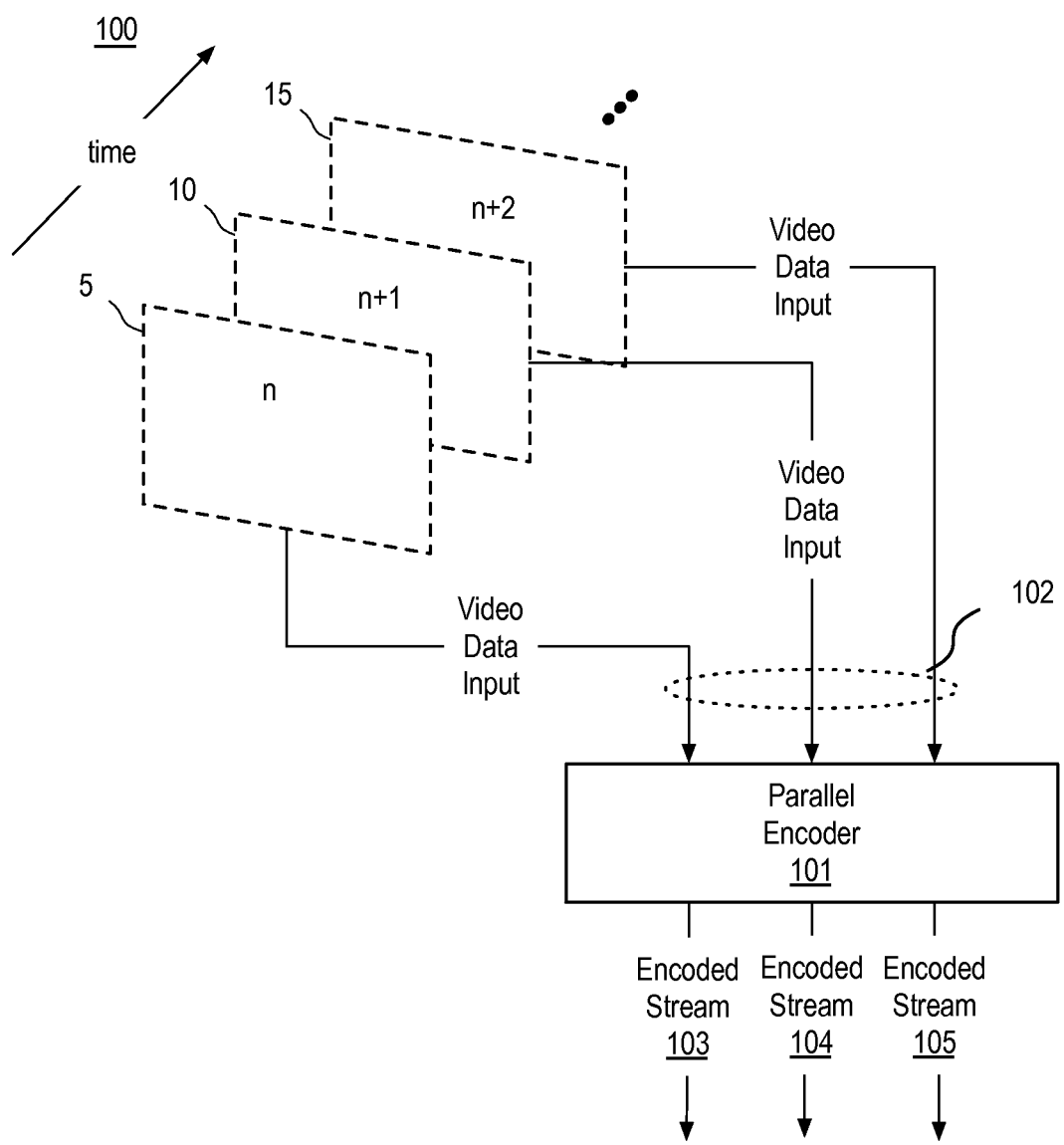
FIG. 1A is a schematic of a parallel video encoding architecture, in accordance with some embodiments.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications beyond what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. Therefore, the following detailed description is not to be taken in a limiting sense and the scope of claimed subject matter is defined solely by the appended claims and their equivalents.

In the following description, numerous details are set forth, however, it will be apparent to one skilled in the art, that embodiments may be practiced without these specific details. Well-known methods and devices are shown in block diagram form, rather than in detail, to avoid obscuring more significant aspects. References throughout this specification to "an embodiment" or "one embodiment" mean that a particular feature, structure, function, or characteristic described in connection with the embodiment is included in at least one embodiment. Thus, the appearances of the phrase "in an embodiment" or "in one embodiment" in various places throughout this specification are not necessarily referring to the same embodiment. Furthermore, the particular features, structures, functions, or characteristics described in the context of an embodiment may be combined in any suitable manner in one or more embodiments. For example, a first embodiment may be combined with a second embodiment anywhere the particular features, structures, functions, or characteristics associated with the two embodiments are not mutually exclusive.

As used in the description of the exemplary embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

As used throughout the description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical, optical, or electrical contact with each other, and/or that the two or more elements co-operate or interact with each other (e.g., as in a cause an effect relationship).

Some portions of the detailed descriptions provide herein are presented in terms of algorithms and symbolic representations of operations on data bits within a computer memory. Unless specifically stated otherwise, as apparent from the following discussion, it is appreciated that throughout the description, discussions utilizing terms such as "calculating," "computing," "determining" "estimating" "storing" "collecting" "displaying," "receiving," "consolidating," "generating," "updating," or the like, refer to the action and processes of a computer system, or similar electronic computing device, that manipulates and transforms data represented as physical (electronic) quantities within the computer system's circuitry including registers and memories into other data similarly represented as physical quantities within the computer system memories or registers or other such information storage, transmission or display devices.

While the following description sets forth embodiments that may be manifested in architectures such system-on-a-chip (SoC) architectures for example. Implementation of the techniques and/or arrangements described herein are not restricted to particular architectures and/or computing systems, and may be implemented by any architecture and/or computing system for similar purposes. Various architectures employing, for example, multiple integrated circuit (IC) chips and/or packages, and/or various computing devices and/or consumer electronic (CE) devices such as set-top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. Furthermore, some material such as, for example, control structures and full software instruction sequences, may not be shown in detail in order not to obscure the material disclosed herein.

Certain portions of the material disclosed herein are implemented in hardware, for example as logic circuitry in a graphics processor. Certain other portions may be implemented in hardware, firmware, software, or any combination thereof. At least some of the material disclosed herein may also be implemented as instructions stored on a machine-readable medium, which may be read and executed by one or more processors (graphics processors and/or central processors). A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other similarly non-transitory, tangible media.

Methods, devices, apparatuses, computing platforms, and articles described herein relate video coding. One or more system, apparatus, method, and computer readable media is described below to determine a target number of bits (i.e., target frame size or target bitrate) that is to be employed in a QP determination for a frame of video being encoded in parallel with one or more other video frames. In further embodiments, the system, apparatus, method, or computer readable media may further generate one or more encoded video data streams based on the determined QP.

In some embodiments described in detail herein, a low complexity rate control is provided to satisfy the HRD buffer constraints in a parallel video encoder. Because the actual number of bits used by one video encoding pipeline for encoding a frame may not be available to another parallel video encoding pipeline encoding another frame as a function of synchronization of the parallel frame encoding, the number of bits used by the immediately preceding frame is estimated by one or more methods. In further embodiments, the technique employed for estimation of the immediately preceding video frame size varies dynamically between frames as a function of availability of the information for the immediately preceding video frame, which may vary with frame synchronization. As such, estimation of the immediately preceding video frame size may follow a first technique for a given frame, and then a second technique for a subsequent frame. In further embodiments, the buffer fullness is updated in a manner dependent upon the frame size estimated for the immediately preceding frame. In further embodiments, the bitrate of a current frame is determined as a function of the current frame type, the bitrate estimated for the immediately preceding frame, and the updated buffer fullness.

In some embodiments, a QP as determined and/or modified based on the target bitrate for the current frame determined in accordance with embodiments herein is used to quantize transform coefficients associated with a chunk of video data. The quantized transform coefficients and quantization parameters may then be encoded into a bitstream for use at a decoder. The decoder may then decompress/decode the bitstream to reproduce frames for presentation/display to an end user following any known technique.

FIG. 1A is a schematic of a parallel video encoding architecture 100, in accordance with some embodiments. In the exemplary embodiment illustrated, frames 5, 10, 15 are received as a plurality of video data inputs 102 to a parallel encoder 101. In some embodiments, frames 5, 10, 15 are a sequence of consecutive video frames, N, N+1, N+2, etc., for example associated with a time series. Parallel encoder 101 is to encode frames 5, 10, 15 in parallel and output corresponding encoded streams 103, 104, 105, which may be subsequently combined and/or multiplexed in any manner as embodiments herein are not limited in this respect. Parallel encoding architecture 100 may for example be implemented by a video compression-decompression (codec) configured to encode input video frames 5, 10, 15 received from any upstream source. In exemplary embodiments, architecture 100 is implemented by a codec that is compatible with one or more standards, such as H.264/MPEG-4 AVC standard, HEVC standard, VP8 standard, VP9 standard.

Figure 1B:
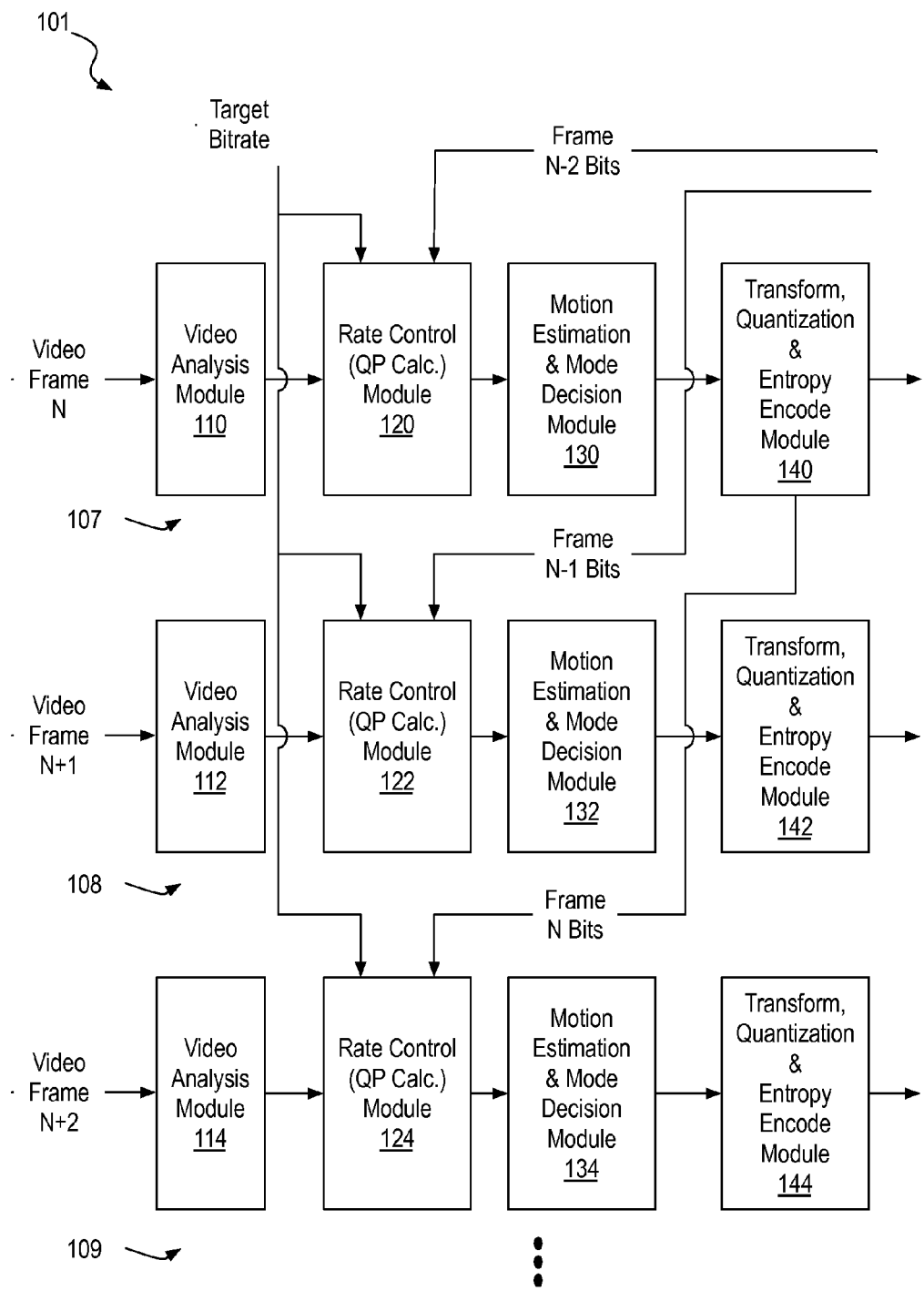
FIG. 1B is a schematic of a parallel video encoder architecture, in accordance with some embodiments.

FIG. 1B is a schematic further illustrating parallel video encoder 101, in accordance with some embodiments. Parallel video encoder 101 has a plurality of encoding pipelines 107, 108, and 109 configured to encode three consecutive video frames N, N+1, and N+2 in parallel. Encoding pipeline 107 further includes a video analysis module 110 coupled to receive an input video frame N, a rate control module 120 coupled to an output of module 110, a motion estimation and mode decision module 130 coupled to an output of module 120, and a transform/quantization, and entropy encode module 140 coupled to an output of module 130. Encoding pipeline 108 further includes a video analysis module 112 coupled to receive an input video frame N+1, a rate control module 122 coupled to an output of module 112, a motion estimation and mode decision module 132 coupled to an output of module 122, and a transform/quantization, and entropy encode module 142 coupled to an output of module 132. Encoding pipeline 109 further includes a video analysis module 114 coupled to receive an input video frame N+2, a rate control module 124 coupled to an output of module 114, a motion estimation and mode decision module 134 coupled to an output of module 124, and a transform/quantization, and entropy encode module 144 coupled to an output of module 134.

In some embodiments, an encoding pipeline of a parallel rate encoder encodes a frame without a priori knowledge of the number of bits used to encode the video frame immediately preceding the frame within a consecutive series of frames. In the exemplary embodiments illustrated by FIG. 1B, each rate control module 120, 122, 124 is further coupled to a target bitrate input and a frame size (number of bits) used for encoding the $(N-2)^{th}$ frame. For example, the number of bits for frame N-2 is output from transform, quantization and entropy module 140 and input into rate control module 124. The rate control modules 120, 122, 124 lack an input of number of bits used in their immediately preceding frames because within the parallel encoding architecture, when one or more rate control calculations are to be performed by a rate control module for the current frame N, the number of bits used for frame N-1 has not yet been output by a transform, quantization and entropy module. In the exemplary architecture, synchronization between pipelines 107, 108, 109 is such that each parallel rate control module 120, 122, 124 processing a current frame N is to receive as an input, the bit size of the frame N-2 that immediately precedes the frame immediately preceding the current frame. Hence, when rate control module 120 starts to process frame N, only information on the number of bits used by frame N-2 is available. Similarly, when rate control module 122 starts to process frame N+1, only information on the number bits used by frame N-1 is available. Finally, when rate control module 124 starts to process frame N+2, only information on the number bits used by frame N is available.

Parallel video encoder 101 exemplifies three parallel video encoding pipelines where the number of bits used to encode the video frame immediately preceding the frame. However, parallelism may be extended (e.g., to 4 pipelines), in which case the techniques and systems described herein to accommodate the lack of a priori knowledge of the number of bits used to encode video frame N-1 may be extended (e.g., to address a lack of bits used in N-2 frame encoding). Although rate control becomes more difficult with increasing parallelism, estimating the number of bits for an N-2 frame, N-3 frame, and even an N-4 frame may be possible following the techniques and architectures described herein for frame N-1 in the context of parallel encoder 101.

In some embodiments, processing of a current video frame includes estimating the number of bits for the prior video frame based at least in part on one or more intermediate parameters generated from the prior video frame processing. For example, in further reference to FIG. 1B, for encoding pipeline 109, rate control module 124 is to determine a target number of bits for video frame N+2 using an estimate of the number of bits for video frame N+1 that is determined based on one or more intermediate parameters or information available from the motion estimation and mode decision module 132, and/or rate control module 122, and/or video analysis module 112. In further embodiments, intermediate parameters or information from encoding pipeline 108 are compared to information and/or intermediate parameters available from encoding pipeline 109 to determine a size for video frame N+2.

Figure 2A:
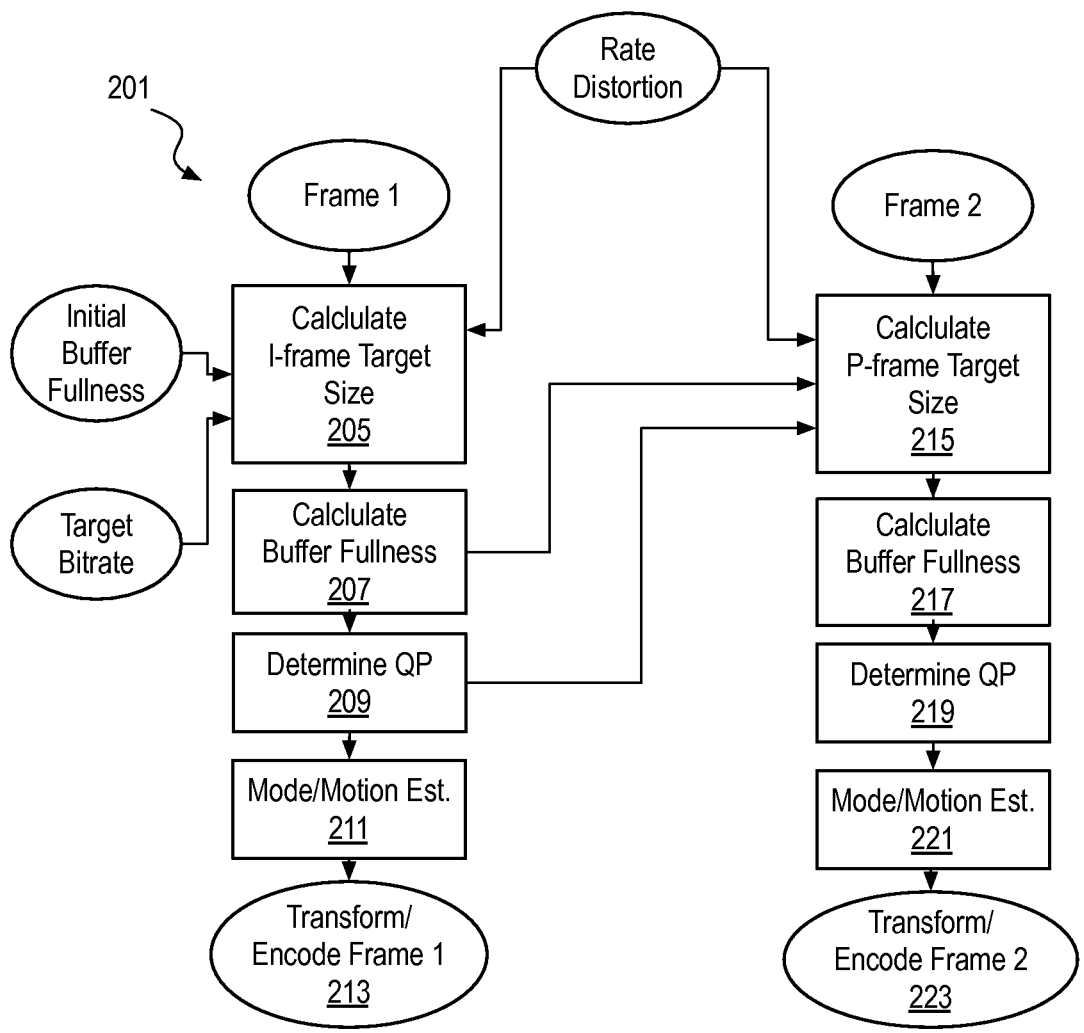
FIG. 2A is a flow diagram illustrating a parallel video encoding rate control method suitable for initial video frames, in accordance with some embodiments.

FIG. 2A is a flow diagram illustrating a parallel video encoding rate control method 201 suitable for initial video frames, in accordance with some embodiments. Method 201 may be performed by a parallel encoder, such as encoder 101, during a bootstrapping phase of parallel video encoding rate control. In method 201, a target number of bits for the first two frames is determined based on the target bitrate, buffer constraint and coding structure. Coding structure specifies frame types that may occur in a group of picture (GOP), such as intra-frames (I-frames) predicted without reference to another frame or frames, and inter-predicted frames predicted with reference to another frame or frames. Predicted frames may further include P-frames predicted with reference to a prior frame or frames and available for use in prediction of other frames, bi-directional frames (B-frames) predicted with reference to a prior or subsequent frame or frames but not available for use in prediction of other frames, and/or reference bi-directional frames (B-reference frames) predicted with reference to another frame or frames and available for use in prediction in hierarchical coding structures.

For frame 1 encoding, a target size is calculated at operation 205. Since the first frame is always an I-frame, the target size of the first frame is usually several times the target average bitrate. The buffer fullness is then determined by any known technique(s) at operation 207. QP is determined at operation 209 through any known technique(s). Encoding mode is determined and motion estimation performed by any known technique(s) at operation 211, and frame 1 is transformed and entropy encoded at operation 213 by any known technique(s).

For frame 2 encoding, a target size is calculated at operation 215 based on the buffer fullness update determined at operation 207 and the QP determined at operation 209. In one example for an IP-only coding structure in a group of pictures (GOP) of L frames in length, the average target bitrate T/frame, the target rate or size for the first P frame will be:

$$TargetRate_{P[1]} = \frac{(T*L - TargetRate_{I[0]})}{L-1}. \quad (1)$$

At operation 217, the buffer fullness before the encoding of the second frame is calculated as:

Bufferfullness[1]=InitialBufferfullness+
TargetRate$_{I[0]}$−$T$. (2)

At operation 219, the corresponding QP is determined based on the target rate the selected rate distortion model:

TargetRate=ƒ(Distortion,QP,constants). (3)

In some embodiments, the model function is given as:

$$TargetRate = \frac{c1*Distortion}{QP} + \frac{c2*Distortion}{QP^2}, \quad (4)$$

where c1, and c2 are constants. Encoding mode is determined and motion estimation performed by any known technique(s) at operation 221, and frame 2 is transformed and entropy encoded at operation 223 by any known technique(s).

Figure 2B:
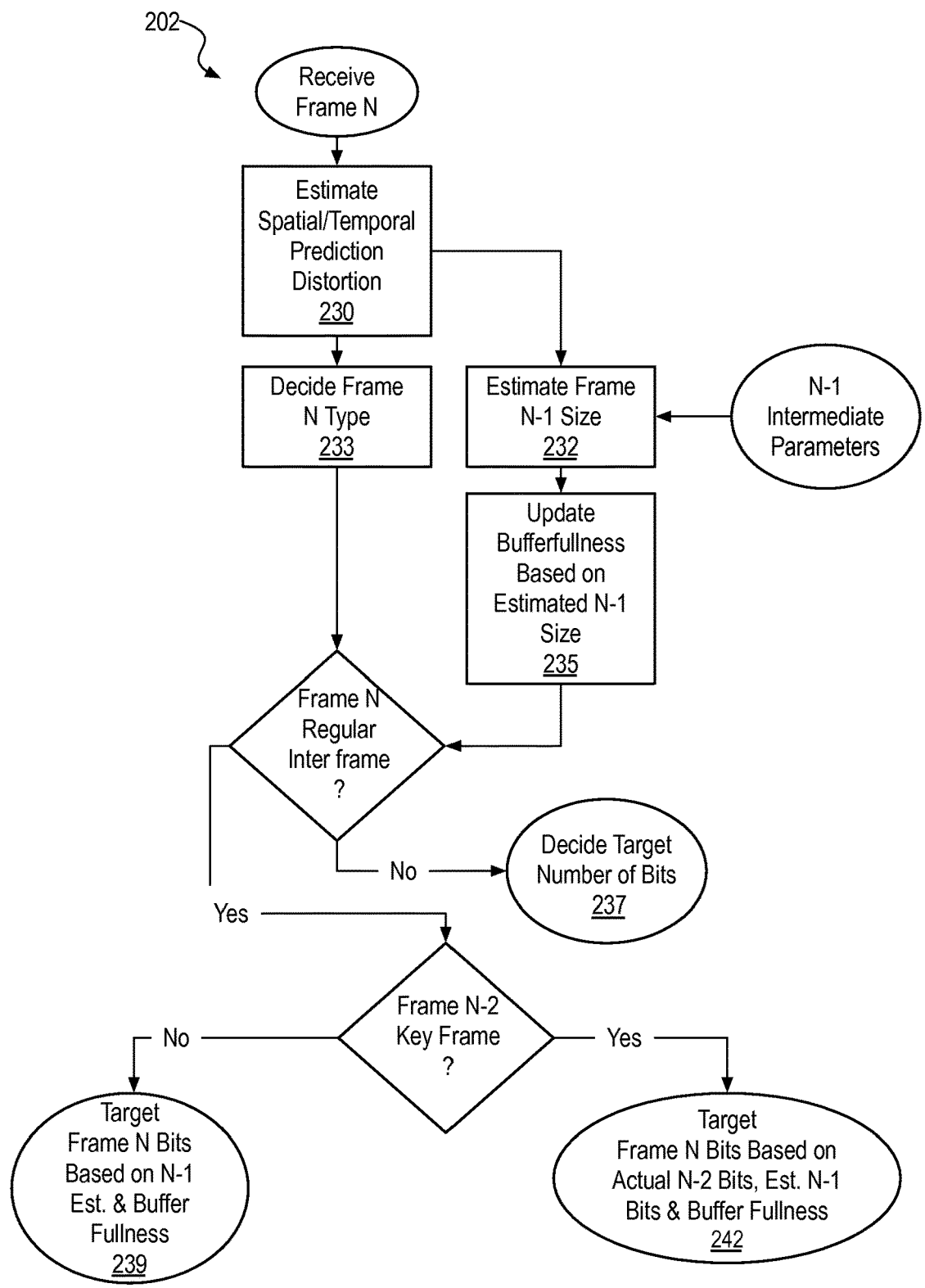
FIG. 2B is a flow diagram illustrating a parallel video encoding rate control method suitable for subsequent video frames, in accordance with some embodiments.

FIG. 2B is a flow diagram illustrating a parallel video encoding rate control method 202 in accordance with some embodiments suitable for the third and subsequent video frames (denoted herein as frame N). In some embodiments, a rate control module (e.g., rate control module 120 in FIG. 1B) performs method 202 for each frame received into a given parallel encoding pipeline. As illustrated in FIG. 2B, at operation 230 video analysis is performed, which may be utilized to estimate the spatial and temporal prediction distortion for a received frame N. For some embodiments, both spatial and temporal complexity may be determined at operation 230 while for other embodiments only one of spatial or temporal complexity may be determined. Spatial and/or temporal complexity may be determined using any suitable technique. In some embodiments, the temporal complexity is estimated based on the inter prediction distortion of frame N. A measure of intra prediction distortion, inter prediction distortion, or both may be based on a statistical measure such as a sum of absolute differences (SAD), a summation of distortion, or the like.

In some embodiments, at operation 233 the current frame N is determined to be a scene change frame, a golden frame (VP8/VP9), a long-term reference frame (AVC, HEVC), an I-frame, or a regular inter-frame (e.g., P or B frame) based on the analysis performed at operation 230 and the coding structure. The number of bits used for the immediately preceding frame N−1 is estimated at operation 232. In some embodiments, operation 232 is performed concurrently with the frame type decision operation 233. In some embodiments, frame size estimation operation 232 is dependent upon the N−1 frame information available to the rate control module as intermediate frame encoding parameter values when operation 232 is performed. One or another of a plurality of methods for estimating the N−1 frame size may be performed as predicated on the N−1 frame information available. Synchronization information indicative of the intermediate parameters available from the prior video frame may be utilized to select between various estimation algorithms at operation 232. Therefore, as a result of variation in the synchronization between the parallel encoding of frame N and frame N−1, frame N−1 size estimation at operation 232 may proceed in a first manner in a first iteration of method 202, while frame N−1 size estimation at operation 232 may proceed in a second manner in a second iteration of method 202.

Figure 3A:
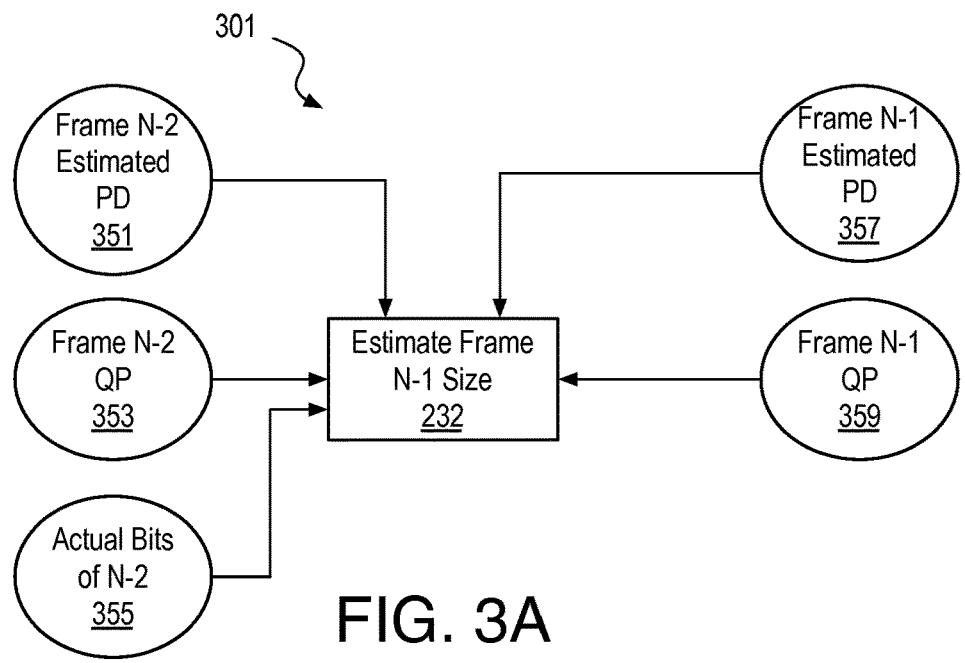
FIGS. 3A, 3B, and 3C are block diagrams illustrating techniques for estimating the size of an immediately preceding frame, in accordance with some embodiments.
Figure 3B:
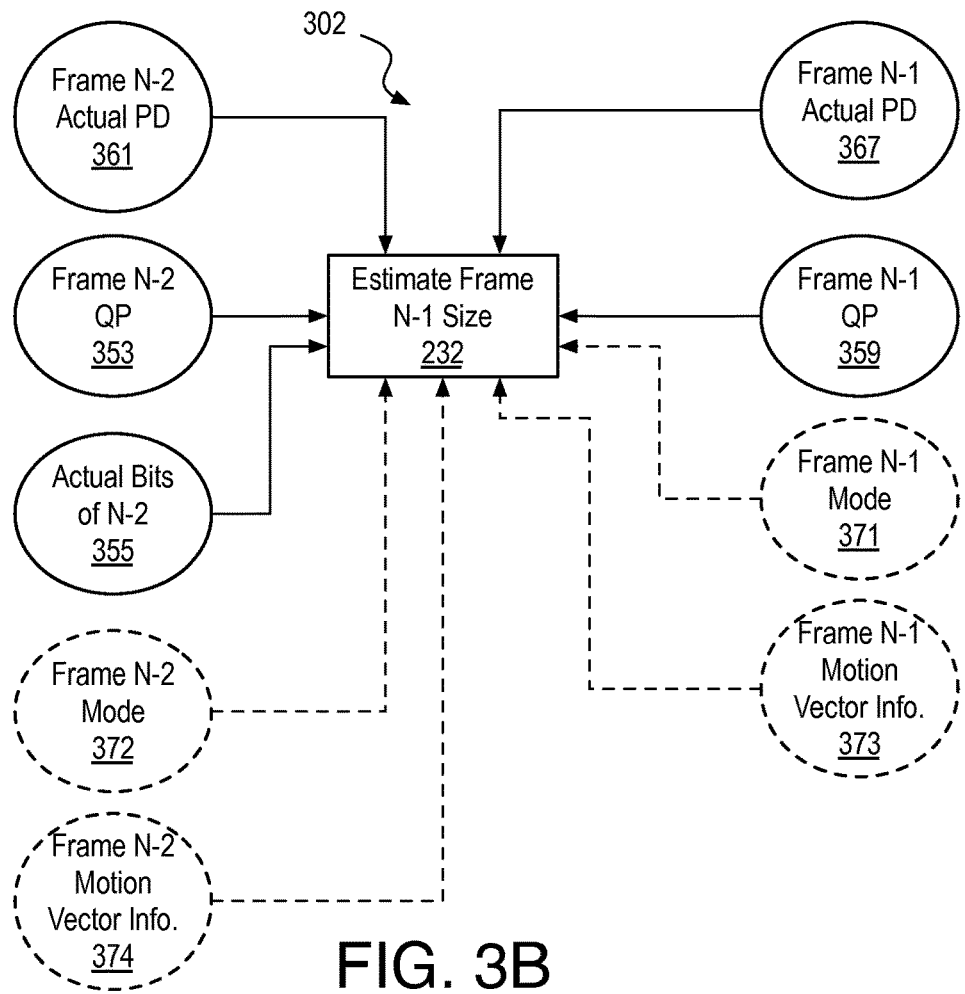
Figure 3C:
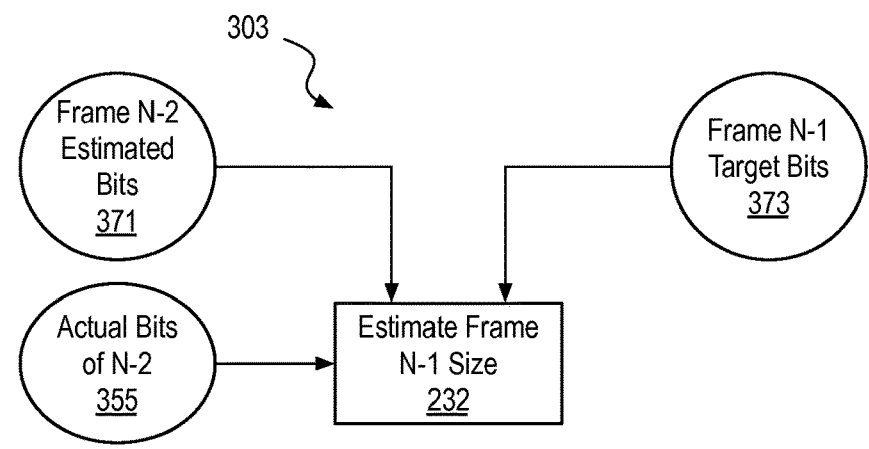

FIGS. 3A, 3B, and 3C are block diagrams illustrating methods 301, 302, 303 for estimating the size of the immediately preceding frame N−1, in accordance with some embodiments. Any of methods 301, 302, 303 may be performed at operation 232 to estimate the frame N−1 size.

Referring first to FIG. 3A, in method 301 frame N−1 size is estimated based on intermediate parameter 357 including an estimated prediction distortion (PD) associated with frame N−1. Intermediate parameter 357 is a result of video analysis operation 230 (FIG. 2B). As further illustrated in FIG. 3A, N−1 size is further estimated based on frame N−1 QP (intermediate parameter 359). Method 301 therefore requires synchronization/delay between two parallel encoding pipelines to be such that video analysis and the QP determination has been performed in the N−1 encoding pipeline by the time the N frame encoding pipeline reaches the frame N−1 estimation operation 232. As further illustrated in FIG. 3A, N−1 size is further estimated based on frame N−2 information including the actual number of bits used for frame N−2 (parameter 355). In some embodiments, N−1 size may be estimated based also on intermediate parameters from N−2 encoding, including for example, the estimated PD associated with frame N−2 (intermediate parameter 351) and frame N−2 QP (intermediate parameter 353). The actual bitrate for the N−2 frame may then be compared with the estimated PD and QP values for the N−2 and N−1 frames to arrive at a good estimate for frame N−1 size. In some embodiments, frame N−1 size is estimated as:

$$EstimatedRate[N-1] = \qquad (5)$$
$$\frac{EstimatedDistortion[N-1]*ActualRate[N-2]*QP[N-2]}{Distortion[N-2]*QP[N-1]}.$$

Referring next to FIG. 3B, frame N−1 size is estimated in method 302 based on intermediate parameter 367, which is the real, or actual, prediction distortion (PD) associated with frame N−1. Actual PD instead of an estimated PD may be utilized where the frame N−1 encoding mode (e.g., skip, intra, inter, etc.) and motion estimation have already been completed before performance of the rate control calculation for the current frame N. As further illustrated in FIG. 3B therefore, frame N−1 size may be further determined as a function of, or based on, the frame N−1 QP along with the actual number of bits of frame N−2, and frame N−2 intermediate parameters including N−2 frame QP, and the actual PD for frame N−2 (intermediate parameter 361).

In some embodiments, as further illustrated in FIG. 3B with dashed line, frame N−1 size may also be determined based, at least in part, on the coding mode of frame N−1 (intermediate parameter 371) and frame N−1 motion vector information (intermediate parameter 373). Coding mode of frame N−1 may be compared to that of frame N−2 (e.g., intermediate parameters 372, 374), and motion vector distribution variation between frame N−1 and N−2 may also be utilized in estimating the frame N−1 size based further on the actual number of bits used in frame N−2. As one example, frame N−1 size may be estimated based on a ratio of the number of blocks coded as skip, and/or the ratio of the number of blocks coded as intra, and/or the ratio of the number of blocks with a same motion vector. So if the current frame is simple with, for example, 80% of blocks coded as skip, true prediction error determined for the remaining 20% (of which may be 10% are intra-code and 10% inter-coded) may be compared to similar parameter values for the N−2 frame to estimate how the N−1 frame size will compare to the N−2 size.

Referring next to FIG. 3C, frame N−1 size is estimated in method 303 based on the target number of bits determined for frame N−1 and a prior size estimated for the N−2 frame. In some embodiments, the N−1 frame size is estimated based target number of bits determined for frame N−1 (intermediate parameter 373), the frame N−2 estimated bits (intermediate parameter 371) and the actual number of bits used for frame N−2. In some embodiments, the N−1 frame size is calculated as:

$$EstimatedRate[N-1] = \frac{TargetRate[N-1]*AcutalRate[N-2]}{EstimatedRate[N-2]}. \quad (6)$$

Figure 3D:
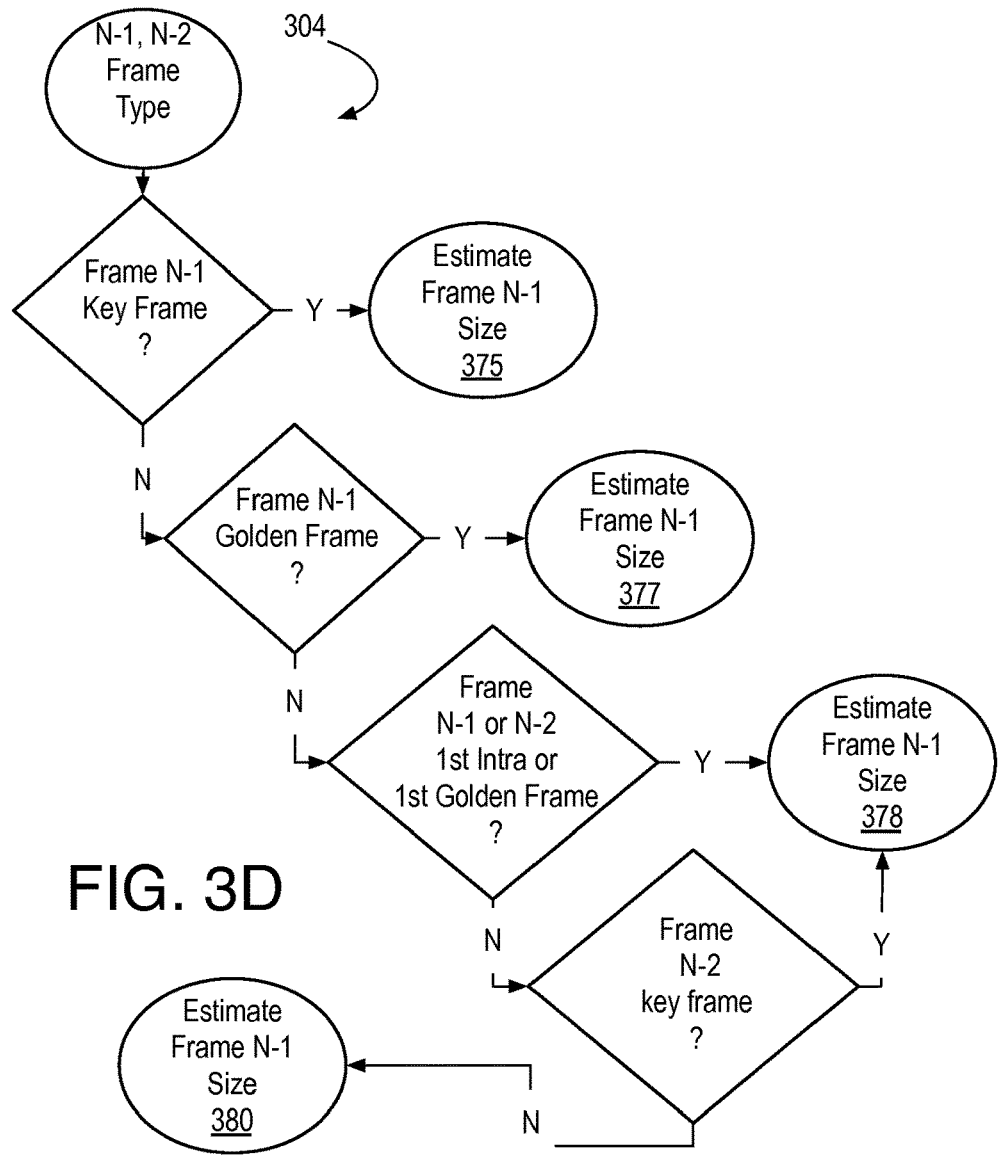
FIG. 3D is a flow diagram illustrating a method of estimating the size of an immediately preceding frame as a function of the frame type, in accordance with some embodiments.

In some embodiments, the number of bits associated with the prior frame is estimated based at least in part on the prior frame type. Performance of any of the methods 301, 302, 303 may be further predicated upon the N−1 frame being of the appropriate type. The size for an N−1 frame of a non-qualifying frame type may then be estimated in an alternative manner. FIG. 3D is a flow diagram illustrating a method 304 for estimating the size of the immediately preceding frame N−1 as a function of the N−1 frame type, in accordance with some embodiments. In method 304, the N−1 frame type is determined and if the N−1 frame is a key frame, such as an intra-coded frame or a scene change frame, the frame N−1 bits are estimated at operation 375. In some embodiments, at operation 375, the frame N−1 bitrate is estimated as a function of the actual bitrate for the last I-frame, a ratio of the distortion in the N−1 frame to that of the last I-frame, and a ratio of the QP in the last I-frame to that of the N−1 frame:

$$EstimatedRate[N-1] = \quad (7)$$
$$\frac{Distortion[N-1]*ActualRate[last\ Intra]*QP[last\ Intra]}{Distortion[last\ Intra]*QP[N-1]}.$$

In response to the N−1 frame instead being a golden frame, method 304 proceeds to operation 377 where the frame N−1 bitrate is estimated as a function of a ratio of the distortion in the N−1 frame to that in the last inter golden frame, and a ratio of the QP in the last inter golden frame to that in the N−1 frame:

$$EstimatedRate[N-1] = \quad (8)$$
$$\frac{Distortion[N-1]*ActualRate[last\ golden]*QP[last\ golden]}{Distortion[last\ golden]*QP[N-1]}.$$

For both Eq. (7) and Eq. (8), the distortion value for at least frame N−1 in some embodiments is estimated based on video analysis as described above. In other embodiments, the distortion value for the last I-frame is also estimated based on the video analysis operation performed for that frame. In other embodiments, actual PD is utilized in Eq. (7) for at least the last I-frame, and in some such embodiments, actual PD for the N−1 frame is also used when available as permitted by synchronization between the parallel frame encoding stages.

Method 304 continues to operation 378 if frame N−1 is instead the first I-frame or the first golden frame, where in some embodiments the N−1 bitrate is estimated as the frame bitrate target:

$$EstimatedRate[N-1]=TargetRate[N-1]. \quad (9)$$

If none of the above conditions for frame N−1 type are satisfied, the N−1 frame bits estimate is further predicated upon the N−2 frame type. In some embodiments, if the N−2 frame is a key frame such as an I-frame, scene change frame, golden frame, method 304 proceeds to operation 378 where the bitrate for frame N−1 is estimated following Eq. (9).

If none of the above frame type conditions on frame N−1 or N−2 are satisfied, the N−1 frame size is determined at operation 380, where any of the methods 301, 302, or 303 may be performed dependent upon the intermediate parameters available from the N−1 frame encoding.

Figure 3E:
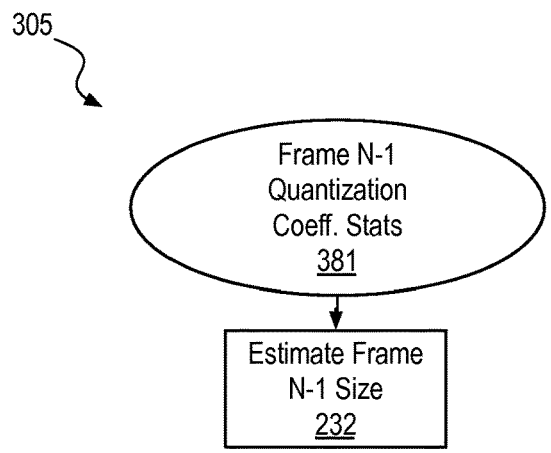
FIG. 3E is a block diagram illustrating a technique for estimating the size of an immediately preceding frame, in accordance with some embodiments.

In some embodiments synchronization between the N−1 frame encoding pipeline and N frame encoding pipeline may be such that transformation and quantization of frame N−1 has already been completed before frame N rate control. For such embodiments, the number bits used for frame N−1 may be estimated following method 305 illustrated in FIG. 3E. The N−1 frame size estimation operation 232 is based, at least in part, on intermediate parameter 381 that includes one or more statistic of non-zero quantization coefficients and/or zero coefficients. The quantization coefficients are available as an intermediate parameter just before the actual number of bits for frame N−1 is known following entropy encoding.

Figure 3F:
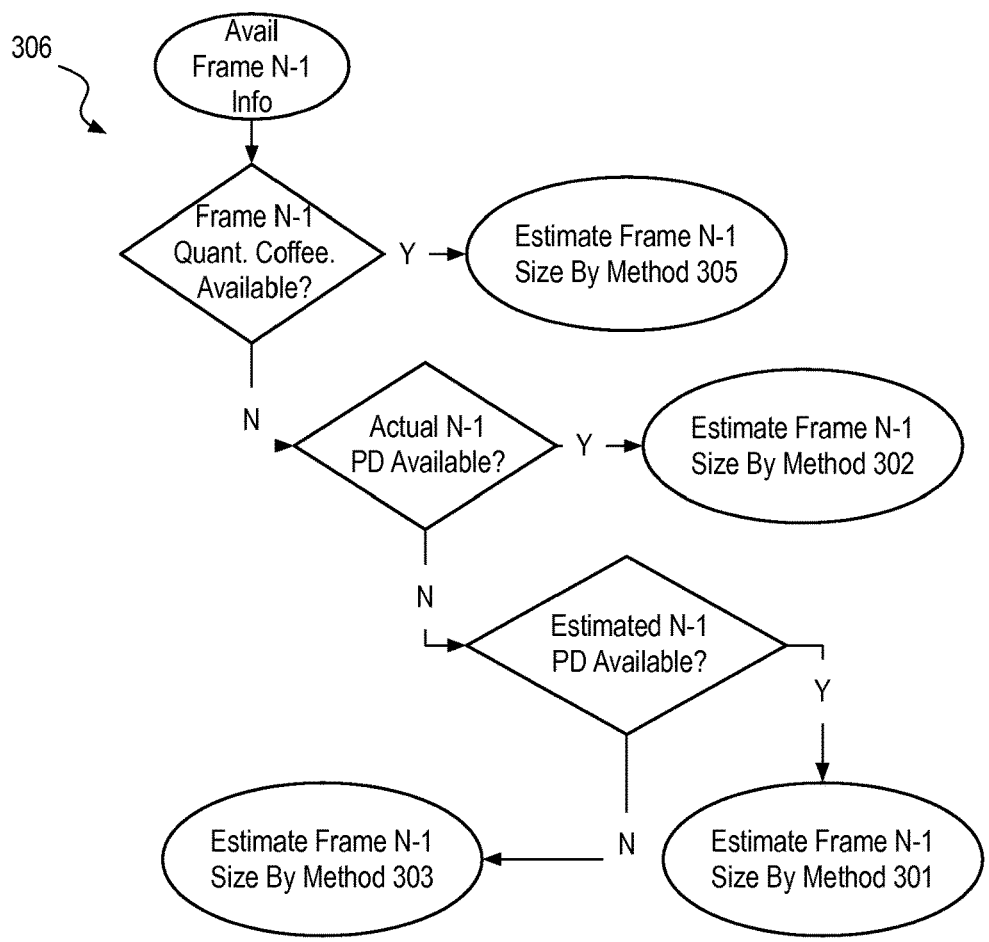
FIG. 3F is a flow diagram illustrating a method of dynamically selecting among a plurality of techniques for estimating the size of an immediately preceding frame, in accordance with some embodiments.

As described above, the various methods of estimating the number of bits used in the N−1 frame encoding rely on different information about the N−1 frame. FIG. 3F is a flow diagram illustrating a method 306 for dynamically selecting among a plurality of techniques for estimating the size of an immediately preceding frame, in accordance with some embodiments. As a function of N−1:N frame encoding synchronization, method 306 proceeds to estimate the size of frame N−1 by method 305 (FIG. 3E) in response to the frame N−1 quantization coefficients being available. In the alternative, method 305 proceeds to estimate the frame N−1 size by method 302 in response to the actual PD being available. In the alternative, method 305 proceeds to estimate frame N−1 size based on an estimated PD in method 301. Finally, method 305 proceeds to estimate frame N−1 size by method 303 if there is minimal delay between frame N−1 and frame N encoding and minimal N−1 frame information is available at the frame N rate control stage.

With the N−1 frame size estimated as described above in the context of FIG. 3A-3F, parallel video encoding rate control method 202 (FIG. 2B) proceeds to operation 235 where buffer fullness is updated based on the estimated size of N−1. In some embodiments, buffer fullness is updated at operation 235 based on a function of a difference between an actual and an estimated bitrate for the N−2 frame and a difference between the estimated bitrate for the N−1 frame and an average bitrate. In one such embodiment, buffer fullness is updated as:

BufferFullness[*N*]=BufferFullness[*N*−1]+ActualRate  
[*N*−2]−EstimatedRate[*N*−2]+*c*4*EstimatedRate  
[*N*−1]−*T*,            (10)

where c4 is a constant. In some embodiments, c4 is in the range of 1 to ~1.5 when BufferFullness[N−1] is less than half of the buffer size, and when BufferFullness[N−1] is greater than half the buffer size, c4 is 1 for variable bit rate (VBR) encoding and in the range of 0.9 to ~1 for constant bit rate (CBR).

In some embodiments, the target bitrate determination for the current video frame N is dependent upon the current frame type. Referring still to FIG. 2B, parallel video encoding rate control method 202 proceeds to determine the target number of bits for current frame N based on the type of frame N and/or the type of frame N−2. Where frame N is not a regular inter-coded frame, the target number of bits for current frame N is determined at operation 237. If current frame N is an intra frame or scene change frame, any target size determination method optimized for such a frame may be used at operation 237 to determine the frame N target bitrate based on the number of bits used by the previous GOP and the updated buffer fullness. Many specialized techniques/algorithms for determining the target size of an intra frame or scene change frame exist in the art, and embodiments herein are not limited in this respect. Likewise, if current frame N is instead a golden frame or a long-term reference frame, any key frame target size determination method suitable for such a frame can be utilized at operation 237. Here too, many specialized techniques/algorithms for determining the target size of golden frame or a long-term reference frame exist in the art, and embodiments herein are not limited in this respect.

In some embodiments, the target bitrate determination for the current video frame N is dependent upon both the current frame type and the prior frame type. Where frame N is a regular inter-coded frame (e.g., a P frame, B reference frame, non-reference B frame or generalized bi-prediction P frame), the target bitrate for current frame N is determined at operation 239 or 242 depending upon whether or not frame N−2 is a key frame. If the N−2 frame is not a key frame, the target bitrate for frame N is determined based on the estimated frame N−1 bitrate and the frame N buffer fullness. In some exemplary embodiments, where the coding structure is IP only and the N−1 frame is a key frame, the frame N target rate may be calculated at operation 239 as:

$$TargetRateP[N] = \frac{T*L - EstimatedRate[N-1]}{L-1}.$$            (11)

For IP coding where the N−1 frame is not a key frame, the P frame N target bitrate in some embodiments is instead calculated at operation 239 as:

TargetRate*P*[*N*]=TargetRate*P*[*N*−1]+*c*5(TargetRate*P*  
[*N*−1]−EstimatedRate[*N*−1]),            (12)

where c5 is a constant, for example in the range of 0.1 to ~0.5.

If the N−2 frame is instead a key frame, the target bitrate is determined at operation 242 based on the actual bitrate for the N−2 frame, the estimated bitrate for frame N−1, and the updated buffer fullness. For example, in some embodiments, in an IP-only coding structure, the P frame N target rate may be calculated at operation 242:

$$TargetRateP[N] = \frac{T*L - ActualRate[N-2]}{L-1}.$$            (13)

Notably, the exemplary embodiments above may be readily extended to coding structures include a B reference frame, and/or a non-reference B frame using similar approaches. Following completion of each iteration of method 202, the current frame N is quantized based on the determined target bitrate, transformed, entropy encoded, etc. by any known techniques.

Figure 4:
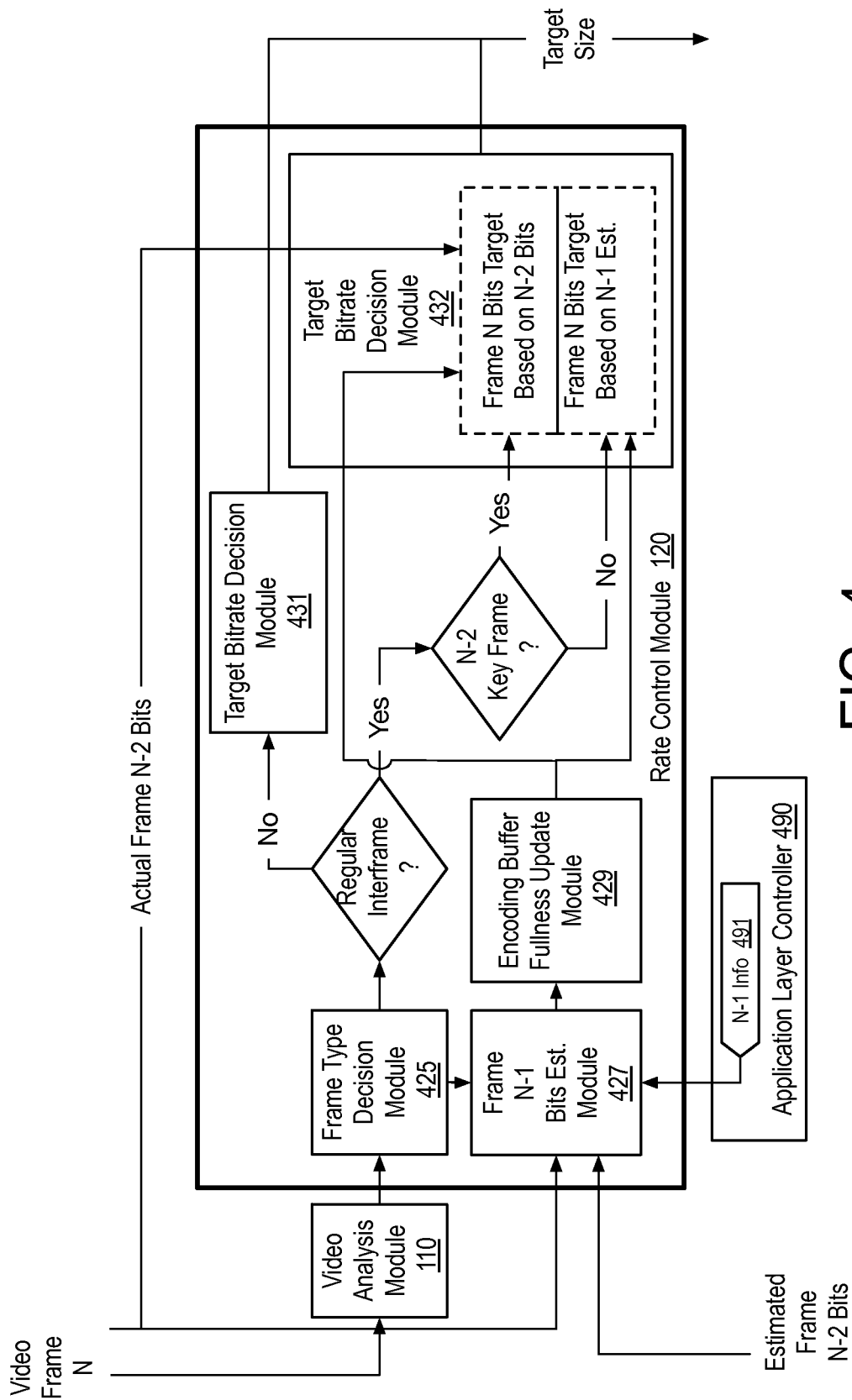
FIG. 4 is a block diagram illustrating a rate control module configured for parallel video encoding rate control, in accordance with some embodiments.

FIG. 4 is a block diagram further illustrating rate control module 120 configured for parallel video encoding rate control, in accordance with some embodiments. Rate control module 120 may for example be employed to perform parallel video encoding rate control method 202. As illustrated in FIG. 4, rate control module 120 includes an input port coupled to an output port of video analysis module 110 to receive video analysis information on frame N. Rate control module 120 further includes a frame type decision module 425 to determine the frame type of the current frame N.

Rate control module 120 further includes a frame N−1 size estimation module 427 having an input coupled to receive the frame N. In some embodiments, frame N−1 size estimation module 427 further includes an input coupled to receive an estimated number of bits for the N−2 frame. In some embodiments, frame N−1 size estimation module 427 is further coupled to receive an indication of the availability of N−1 frame information, such as an actual PD, or other intermediate information generated external to rate control module 120. For example, in the exemplary embodiment illustrated in FIG. 4, size estimation module 427 is coupled to receive N−1 frame intermediate parameter information 491 from an application layer controller 490. In some embodiments, frame N−1 size estimation module 427 includes logic to perform any of the N−1 frame size estimation methods described elsewhere herein in the context of FIG. 3A-3F.

An output of frame N−1 size estimation module 427 is coupled to an input of encoding buffer fullness update module 429. In some embodiments, encoding buffer fullness update module 429 includes logic to update the buffer fullness based at least in part on the N−1 size estimation received from size estimation module 427. Target bitrate decision module 431 and target bitrate decision module 432 are selectively utilized to determine the target size of frame N as a function of the frame N type and/or the N−2 frame, for example following the techniques described above in the context of FIG. 2B. The target bitrate decision module 431 includes logic to determine a target size of an I-frame, scene change frame, golden frame, or long-term reference frame, for example following the techniques described above in the context of FIG. 2B. Target bitrate decision module 432 includes logic to determine frame N target number of bits based on the estimated number of bits for the N−1 and/or the number N−2 frame bits, for example following the techniques described above in the context of FIG. 2B. Rate control module 120 further includes an output port coupled to provide a target number of bits for frame N, for example based on an output from target bitrate decision module 431 or target bitrate decision module 432.

Figure 5:
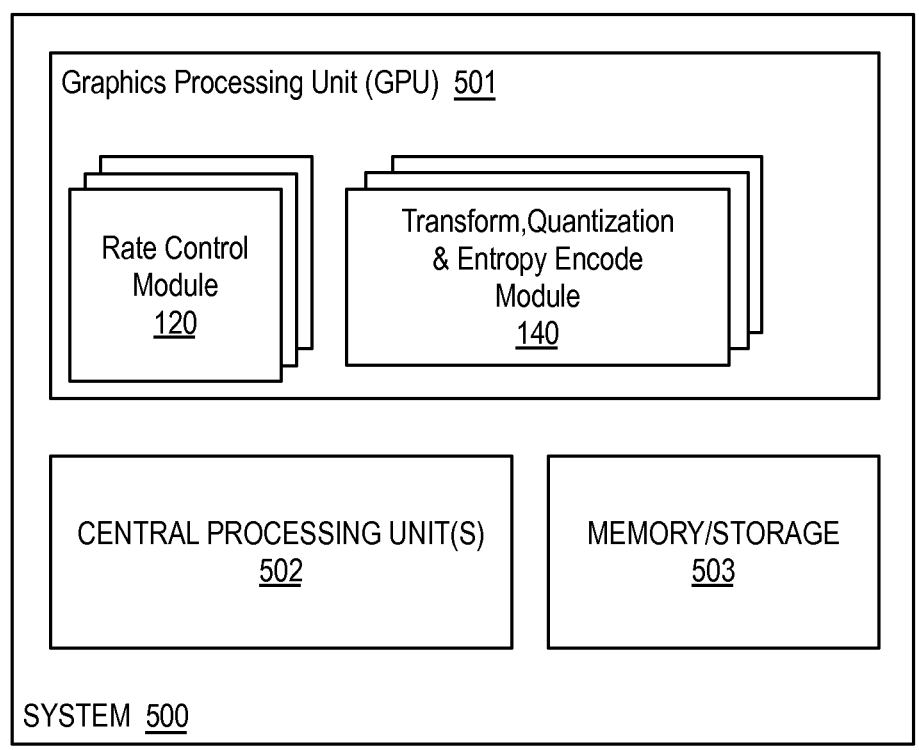
FIG. 5 is a block diagram illustrating a video processing system including a rate control module configured for parallel video encoding rate control, in accordance with some embodiments.

FIG. 5 is a block diagram of an exemplary system 500 configured to parallel encode video, arranged in accordance with some embodiments. As shown in FIG. 5, system 500 may include a graphics processing unit (GPU) 501, one or more central processing units 502, and memory stores 503. Also as shown, GPU 501 includes a plurality of parallel rate control modules 120, and a plurality of parallel transform, quantization and entropy encoding modules 140. In the exemplary system 500, electronic memory 503 may store video content such as video frames and/or a video bitstream.

Graphics processing unit 501 may include any number and type of graphics processing units that may provide the operations as discussed herein. Such operations may be implemented via software or hardware or a combination thereof. In an embodiment, the illustrated modules of graphics processing unit 501 may be implemented with logic circuitry. For example, graphics processing unit 501 may include circuitry dedicated to manipulate video data to generate compressed image data. Central processing unit(s) 502 may include any number and type of processing units or modules that may provide control and other high level functions for system 500. Memory 503 may be any type of memory such as volatile memory (e.g., Static Random Access Memory (SRAM), Dynamic Random Access Memory (DRAM), etc.) or non-volatile memory (e.g., flash memory, etc.), and so forth. In some embodiments, memory 503 is configured to store video data such as frame-level intermediate encoding parameters, quantized transform coefficients, estimated frame sizes, or any other video data discussed herein. In a non-limiting example, memory 503 is implemented by cache memory of GPU 501. In some embodiments, parallel rate control modules 120 and parallel transform, quantization and entropy encoding modules 140 are implemented via execution units (EU) of graphics processing unit 501. Each EU may include, for example, programmable logic or circuitry that may provide a wide array of programmable logic functions. In some embodiments, parallel rate control modules 120 and parallel transform, quantization and entropy encoding modules 140 are implemented with dedicated hardware such as fixed function circuitry or the like. Fixed function circuitry may provide a set of fixed function entry points that may map to the dedicated logic for a fixed purpose or function.

Various components of the systems described herein may be implemented in software, firmware, and/or hardware and/or any combination thereof. For example, various components of system 400 or system 500 may be provided, at least in part, by hardware of a computing System-on-a-Chip (SoC) such as may be found in a computing system such as, for example, a smart phone or other mobile computing device. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the exemplary methods discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of parallel encoder 101, rate control module 120, system 500, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 6:
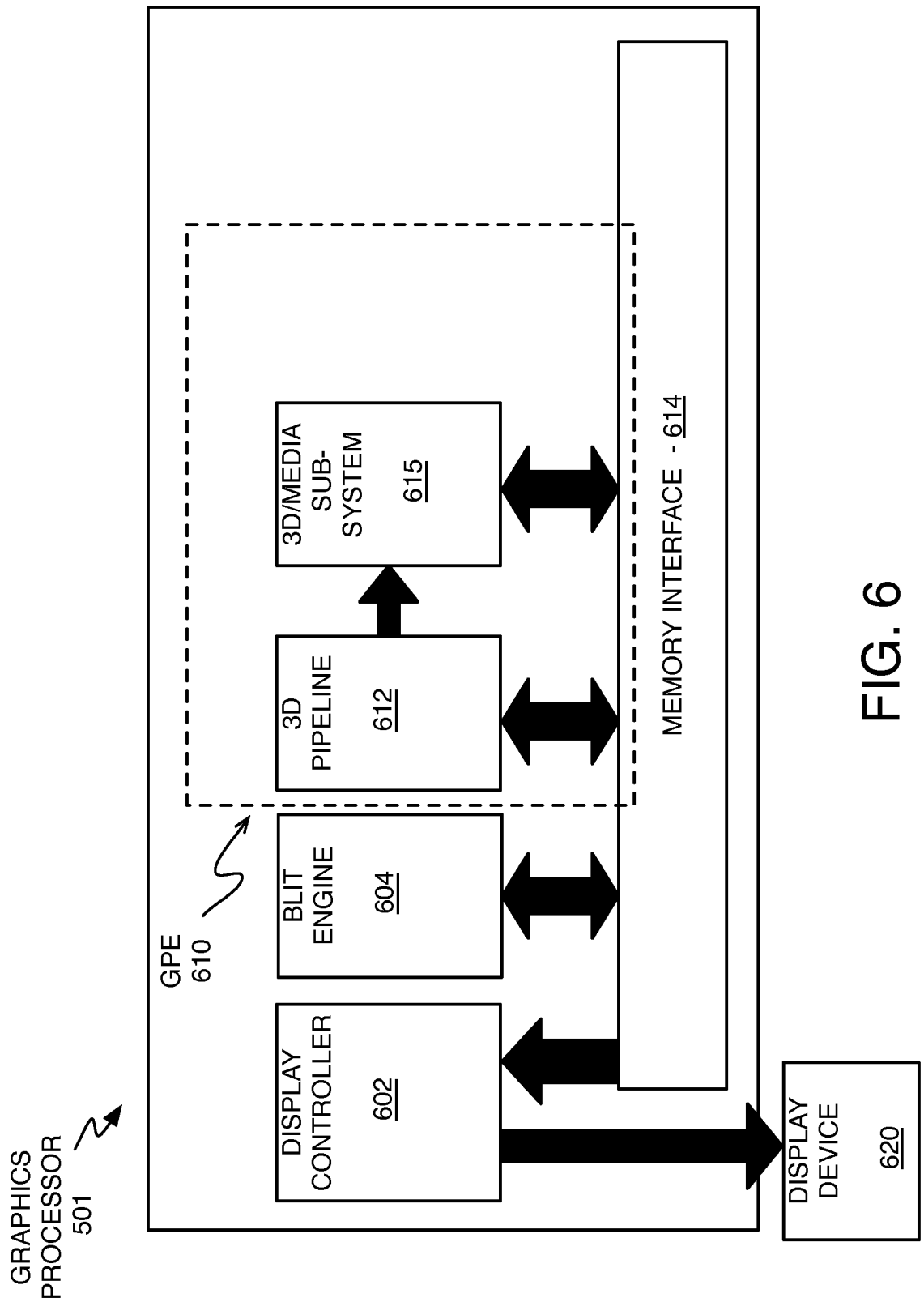
FIG. 6 is a block diagram of an embodiment of a for a graphics processor, according to some embodiments.

FIG. 6 is a block diagram of a graphics processor 600, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 600 includes a memory interface 614 to access memory. Memory interface 614 can be an interface to local memory, one or more internal caches, one or more shared external caches, and/or to system memory.

In some embodiments, graphics processor 600 also includes a display controller 602 to drive display output data to a display device 620. Display controller 602 includes hardware for one or more overlay planes for the display and composition of multiple layers of video or user interface elements. In some embodiments, graphics processor 600 includes a video codec engine 606 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 600 includes a block image transfer (BLIT) engine 604 to perform two-dimensional (2D) rasterizer operations including, for example, bit-boundary block transfers. However, in one embodiment, 2D graphics operations are performed using one or more components of the graphics-processing engine (GPE) 610. In some embodiments, graphics-processing engine 610 is a compute engine for performing graphics operations, including three-dimensional (3D) graphics operations and media operations.

In some embodiments, GPE 610 includes a 3D pipeline 612 for performing 3D operations, such as rendering three-dimensional images and scenes using processing functions that act upon 3D primitive shapes (e.g., rectangle, triangle, etc.). The 3D pipeline 612 includes programmable and fixed function elements that perform various tasks within the element and/or spawn execution threads to a 3D/Media sub-system 615. While 3D pipeline 612 can be used to perform media operations, an embodiment of GPE 610 also includes a media pipeline 616 that is specifically used to perform media operations, such as video post-processing and image enhancement.

In some embodiments, media pipeline 616 includes fixed function or programmable logic units to perform one or more specialized media operations, such as video decode acceleration, video de-interlacing, and video encode acceleration in place of, or on behalf of video codec engine 606. In some embodiments, media pipeline 616 additionally includes a thread spawning unit to spawn threads for execution on 3D/Media sub-system 615. The spawned threads perform computations for the media operations on one or more graphics execution units included in 3D/Media sub-system 615.

In some embodiments, 3D/Media subsystem 615 includes logic for executing threads spawned by 3D pipeline 612 and media pipeline 616. In one embodiment, the pipelines send thread execution requests to 3D/Media subsystem 615, which includes thread dispatch logic for arbitrating and dispatching the various requests to available thread execution resources. The execution resources include an array of graphics execution units to process the 3D and media threads. In some embodiments, 3D/Media subsystem 615 includes one or more internal caches for thread instructions and data. In some embodiments, the subsystem also includes shared memory, including registers and addressable memory, to share data between threads and to store output data.

Figure 7:
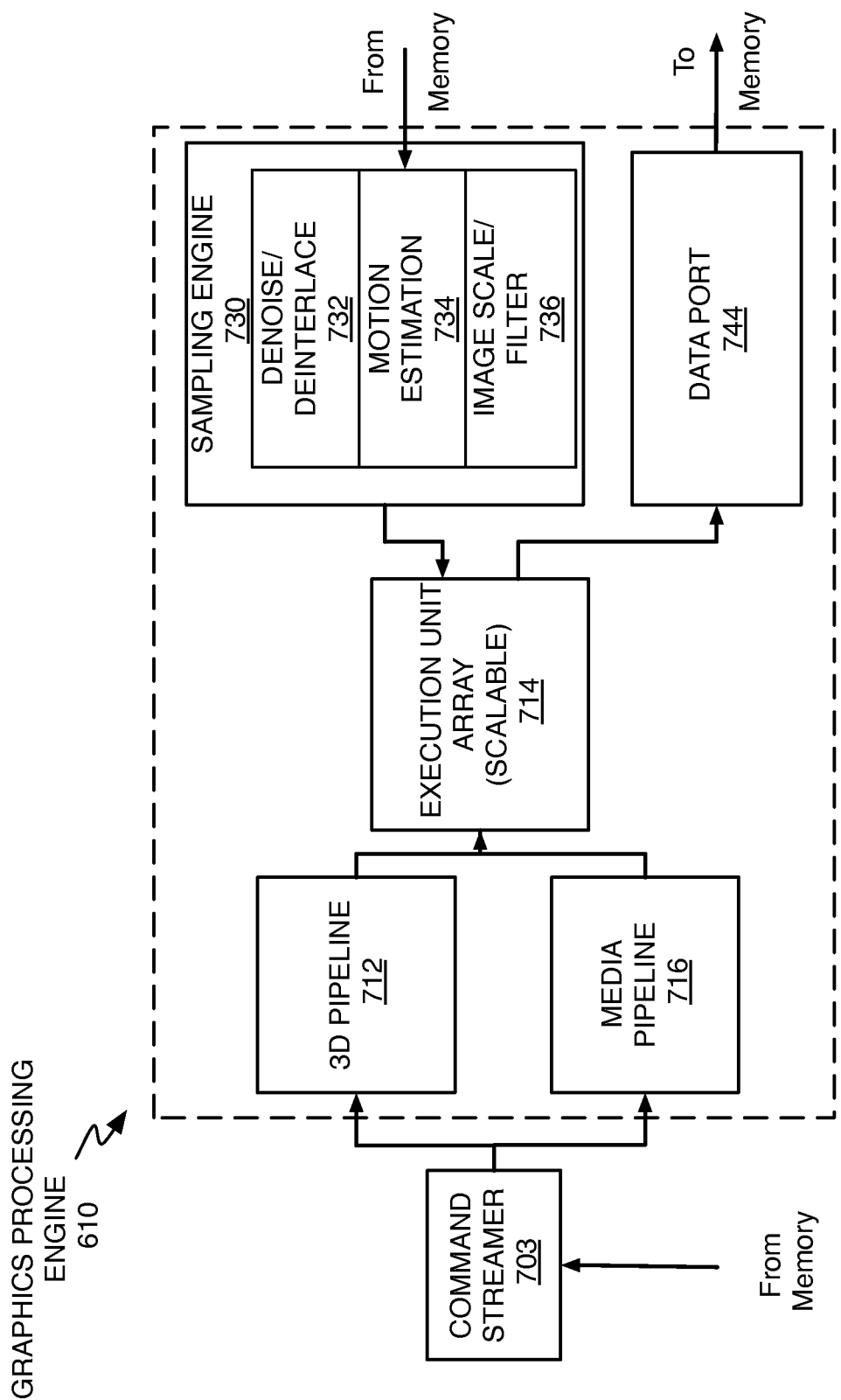
FIG. 7 is a block diagram of another embodiment of a graphics processing engine, according to some embodiments.

FIG. 7 is a block diagram of a graphics processing engine 710 of a graphics processor in accordance with some embodiments. In one embodiment, the GPE 710 is a version of the GPE 610 shown in FIG. 6. Elements of FIG. 7 having the same reference numbers (or names) as the elements of any other figure herein can operate or function in any manner similar to that described elsewhere herein, but are not limited to such.

In some embodiments, GPE 710 couples with a command streamer 703, which provides a command stream to the GPE 3D and media pipelines 712, 716. In some embodiments, command streamer 703 is coupled to memory, which can be system memory, or one or more of internal cache memory and shared cache memory. In some embodiments, command streamer 703 receives commands from the memory and sends the commands to 3D pipeline 712 and/or media pipeline 716. The 3D and media pipelines process the commands by performing operations via logic within the respective pipelines or by dispatching one or more execution threads to an execution unit array 714. In some embodiments, execution unit array 714 is scalable, such that the array includes a variable number of execution units based on the target power and performance level of GPE 710.

In some embodiments, a sampling engine 730 couples with memory (e.g., cache memory or system memory) and execution unit array 714. In some embodiments, sampling engine 730 provides a memory access mechanism for execution unit array 714 that allows execution array 714 to read graphics and media data from memory. In some embodiments, sampling engine 730 includes logic to perform specialized image sampling operations for media.

In some embodiments, the specialized media sampling logic in sampling engine 730 includes a de-noise/de-interlace module 732, a motion estimation module 734, and an image scaling and filtering module 736. In some embodiments, de-noise/de-interlace module 732 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 732 includes dedicated motion detection logic (e.g., within the motion estimation engine 734).

In some embodiments, motion estimation engine 734 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 734 to perform operations on video at the macro-block level that may otherwise be too computationally intensive to perform with a general-purpose processor. In some embodiments, motion estimation engine 734 is generally available to graphics processor components to assist with video decode and processing functions that are sensitive or adaptive to the direction or magnitude of the motion within video data.

In some embodiments, image scaling and filtering module 736 performs image-processing operations to enhance the visual quality of generated images and video. In some embodiments, scaling and filtering module 736 processes image and video data during the sampling operation before providing the data to execution unit array 714.

In some embodiments, the GPE 710 includes a data port 744, which provides an additional mechanism for graphics subsystems to access memory. In some embodiments, data port 744 facilitates memory access for operations including render target writes, constant buffer reads, scratch memory space reads/writes, and media surface accesses. In some embodiments, data port 744 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 714 communicate with the data port by exchanging messages via a data distribution interconnect that couples each of the sub-systems of GPE 710.

Figure 8:
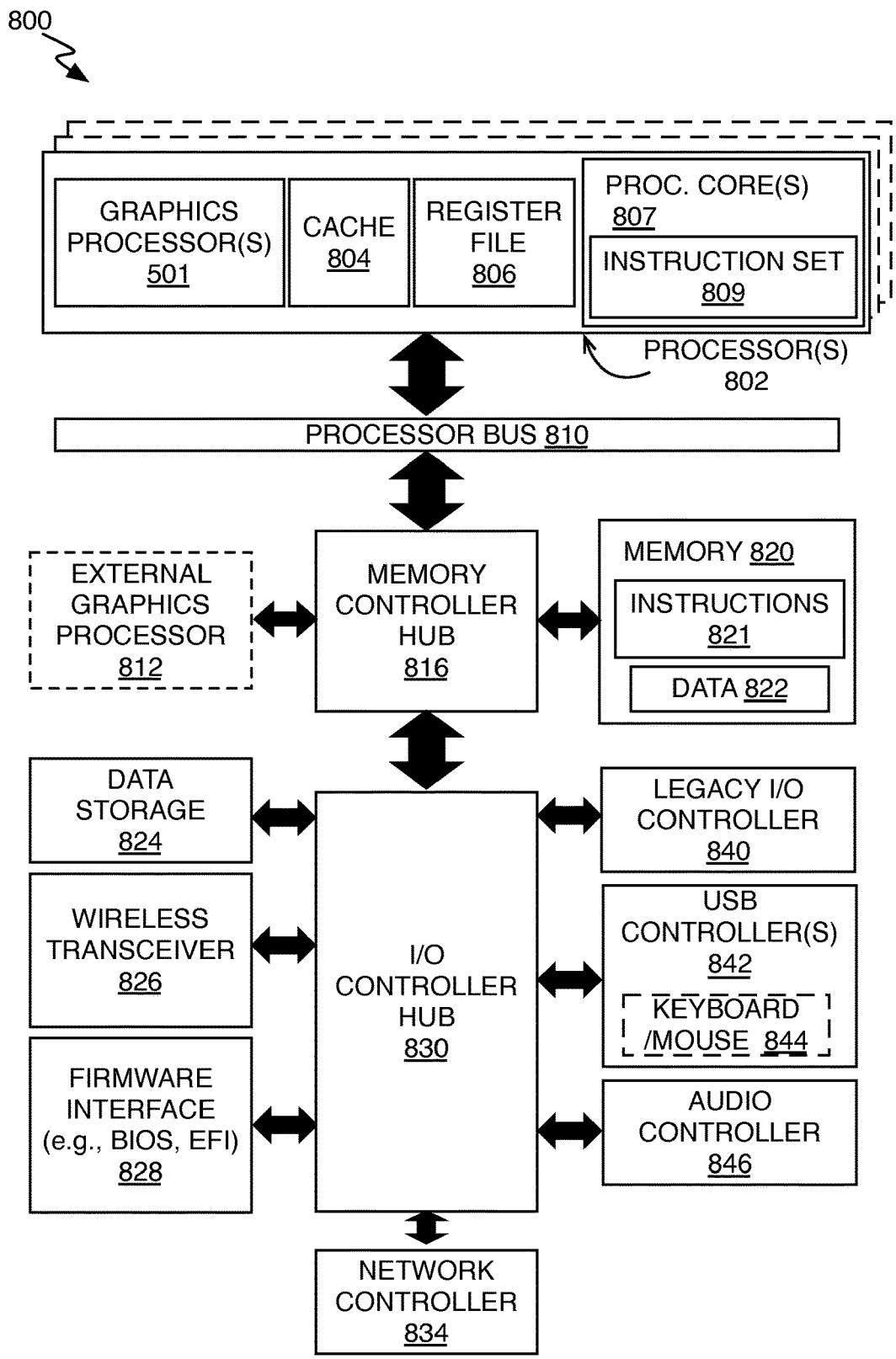
FIG. 8 is a block diagram of a data processing system, according to some embodiments.

FIG. 8 is a block diagram of a data processing system 800, according to some embodiments. Data processing system 800 includes one or more processors 802 and one or more graphics processors 808, and may be a single processor desktop system, a multiprocessor workstation system, or a server system having a large number of processors 802 or processor cores 807. In on embodiment, the data processing system 800 is a system-on-a-chip (SoC) integrated circuit for use in mobile, handheld, or embedded devices.

An embodiment of data processing system 800 can include, or be incorporated within a server-based gaming platform, a game console, including a game and media console, a mobile gaming console, a handheld game console, or an online game console. In some embodiments, data processing system 800 is a mobile phone, smart phone, tablet computing device or mobile Internet device. Data processing system 800 can also include, couple with, or be integrated within a wearable device, such as a smart watch wearable device, smart eyewear device, augmented reality device, or virtual reality device. In some embodiments, data processing system 800 is a television or set top box device having one or more processors 802 and a graphical interface generated by one or more graphics processors 808.

In some embodiments, the one or more processors 802 each include one or more processor cores 807 to process instructions which, when executed, perform operations for system and user software. In some embodiments, each of the one or more processor cores 807 is configured to process a specific instruction set 809. In some embodiments, instruction set 809 may facilitate Complex Instruction Set Computing (CISC), Reduced Instruction Set Computing (RISC), or computing via a Very Long Instruction Word (VLIW). Multiple processor cores 807 may each process a different instruction set 809, which may include instructions to facilitate the emulation of other instruction sets. Processor core 807 may also include other processing devices, such a Digital Signal Processor (DSP).

In some embodiments, the processor 802 includes cache memory 804. Depending on the architecture, the processor 802 can have a single internal cache or multiple levels of internal cache. In some embodiments, the cache memory is shared among various components of the processor 802. In some embodiments, the processor 802 also uses an external cache (e.g., a Level-3 (L3) cache or Last Level Cache (LLC)) (not shown), which may be shared among processor cores 807 using known cache coherency techniques. A register file 806 is additionally included in processor 802 which may include different types of registers for storing different types of data (e.g., integer registers, floating point registers, status registers, and an instruction pointer register). Some registers may be general-purpose registers, while other registers may be specific to the design of the processor 802.

In some embodiments, processor 802 is coupled to a processor bus 810 to transmit data signals between processor 802 and other components in system 800. System 800 uses an exemplary 'hub' system architecture, including a memory controller hub 816 and an input output (I/O) controller hub 830. Memory controller hub 816 facilitates communication between a memory device and other components of system 800, while I/O Controller Hub (ICH) 830 provides connections to I/O devices via a local I/O bus.

Memory device 820 can be a dynamic random access memory (DRAM) device, a static random access memory (SRAM) device, flash memory device, or some other memory device having suitable performance to serve as process memory. Memory 820 can store data 822 and instructions 821 for use when processor 802 executes a process. Memory controller hub 816 also couples with an optional external graphics processor 812, which may communicate with the one or more graphics processors 808 in processors 802 to perform graphics and media operations.

In some embodiments, ICH 830 enables peripherals to connect to memory 820 and processor 802 via a high-speed I/O bus. The I/O peripherals include an audio controller 846, a firmware interface 828, a wireless transceiver 826 (e.g., Wi-Fi, Bluetooth), a data storage device 824 (e.g., hard disk drive, flash memory, etc.), and a legacy I/O controller for coupling legacy (e.g., Personal System 2 (PS/2)) devices to the system. One or more Universal Serial Bus (USB) controllers 842 connect input devices, such as keyboard and mouse 844 combinations. A network controller 834 may also couple to ICH 830. In some embodiments, a high-performance network controller (not shown) couples to processor bus 810.

Figure 9:
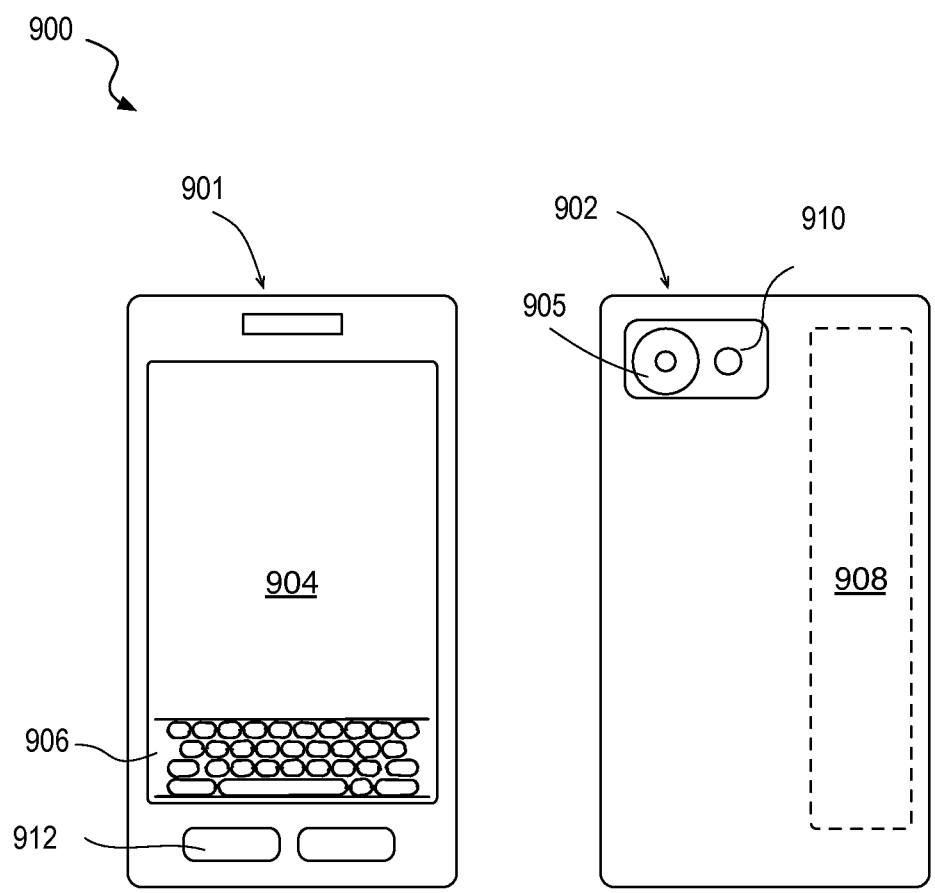
FIG. 9 is a diagram of an exemplary mobile device, arranged in accordance with some embodiments.

As shown in FIG. 9, device 900 may include a housing 902, a display 904, an input/output (I/O) device 906, and an antenna 908. Device 900 also may include navigation features 912. Display 904 may include any suitable display unit for displaying information appropriate for a mobile computing device. I/O device 906 may include any suitable I/O device for entering information into a mobile computing device. Examples for I/O device 906 may include an alphanumeric keyboard, a numeric keypad, a touch pad, input keys, buttons, switches, rocker switches, microphones, speakers, voice recognition device and software, and so forth. Information also may be entered into device 900 by way of microphone (not shown), or may be digitized by a voice recognition device. Embodiments are not limited in this context. In some embodiments, device 900 further includes data processing system 800.

Embodiments described herein may be implemented using hardware elements, software elements, or a combination of both. Examples of hardware elements or modules include: processors, microprocessors, circuitry, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software elements or modules include: applications, computer programs, application programs, system programs, machine programs, operating system software, middleware, firmware, routines, subroutines, functions, methods, procedures, software interfaces, application programming interfaces (API), instruction sets, computing code, computer code, code segments, computer code segments, data words, values, symbols, or any combination thereof. Determining whether an embodiment is implemented using hardware elements and/or software elements may vary in accordance with any number of factors considered for the choice of design, such as, but not limited to: desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable storage medium. Such instructions may reside, completely or at least partially, within a main memory and/or within a processor during execution thereof by the machine, the main memory and the processor portions storing the instructions then also constituting a machine-readable storage media. Programmable logic circuitry may have registers, state machines, etc. configured by the processor implementing the computer readable media. Such logic circuitry, as programmed, may then be understood to have been physically transformed into a system falling within the scope of the embodiments described herein. Instructions representing various logic within the processor, which when read by a machine may also cause the machine to fabricate logic adhering to the architectures described herein and/or to perform the techniques described herein. Such representations, known as cell designs, or IP cores, may be stored on a tangible, machine-readable medium and supplied to various customers or manufacturing facilities to load into the fabrication machines that actually make the logic or processor.

While certain features set forth herein have been described with reference to embodiments, this description is not intended to be construed in a limiting sense. Hence, various modifications of the implementations described herein, as well as other implementations, which are apparent to persons skilled in the art to which the present disclosure pertains are deemed to be within the spirit and scope of the present disclosure.

The following examples pertain to particular exemplary embodiments.

In one or more first embodiments, an apparatus for parallel video encoding includes one or more encoding pipeline to process a prior video frame, or portion thereof, and to generate one or more intermediate parameters indicative of the encode process. The apparatus further includes an additional encoding pipeline to process a current video frame, or portion thereof. The additional encoding pipeline includes a rate controller further comprising a prior video frame size estimation module including logic to estimate a bitrate for the prior video frame based at least in part on the one or more intermediate parameters. The rate controller further comprises a buffer fullness update module coupled to the size estimation module, the buffer fullness update module including logic to update a buffer fullness based at least in part on the bitrate estimate. The rate controller further comprises a target bitrate decision module including logic to determine a target bitrate for the current video frame based at least in part on the bitrate estimate and the buffer fullness update.

In furtherance of the first embodiments, the estimation module is to estimate the bitrate of the prior frame in a manner dependent on synchronization information indicative of the intermediate parameters available from the prior video frame processing.

In furtherance of the first embodiments, the one or more encoding pipeline further comprises a first encoding pipeline to process a first video frame, or portion thereof, immediately preceding the current video frame, a second encoding pipeline to process a third video frame immediately preceding the second video frame. The size estimation module includes logic to estimate the first video frame bitrate as a function of at least one of: a first set of intermediate parameters comprising a target bitrate associated with the first video frame, an actual bitrate associated with the second video frame, and an estimated bitrate associated with the second video frame; a second set of intermediate parameters comprising an estimated prediction distortion (PD) associated with the first video frame and a quantization parameter (QP) value associated with the first video frame, a QP value associated with the second video frame, and the actual bitrate associated with the second video frame; a third set of intermediate parameters comprising an actual PD associated with the first video frame, actual PD associated with the second video frame, and the actual bitrate associated with the second video frame; or a fourth set of intermediate parameters comprising a statistic of quantization coefficients associated with the first video frame.

In furtherance of the embodiments immediately above, the size estimation module includes logic to estimate the first video frame bitrate based on the estimated prediction distortion and a QP value associated with the first video frame, and an estimated prediction distortion, a QP value, and actual bitrate associated with the second video frame.

In furtherance of the embodiments above, the size estimation module further includes logic to estimate the first video frame bitrate based on a function of an actual prediction distortion, encoding mode, and motion vector estimation of the first video frame, actual prediction distortion of the second video frame, and actual bitrate of the second video frame.

In furtherance of the embodiments above, the size estimation module further comprises logic to estimate the first video frame bitrate based on the actual PD of the first video frame in response to the actual PD of the first video frame being available, and estimate the first video frame bitrate based on the estimated PD or the target bitrate associated with the first video frame in response to the actual PD of the first video frame being unavailable.

In furtherance of the first embodiments, the one or more encoding pipeline further comprises a first encoding pipeline to process a first video frame, or portion thereof, immediately preceding the current video frame, a second encoding pipeline to process a third video frame immediately preceding the second video frame, and the size estimation module further includes logic to estimate the first video frame bitrate based at least in part on one or more intermediate parameters generated from the second video frame processing.

In furtherance of the first embodiments, the rate controller further includes logic to determine the bitrate associated with the prior frame based at least in part on the prior frame type.

In furtherance of the embodiment immediately above, the one or more encoding pipeline further comprises a first encoding pipeline to process a first video frame, or portion thereof, immediately preceding the current video frame, and a second encoding pipeline to process a third video frame immediately preceding the second video frame. The rate controller further includes logic to estimate the first video frame bitrate as the target bitrate in response to the first frame being a first intra frame, or in response to the second video frame being an intra-frame, scene change frame, or golden frame.

In furtherance of the first embodiments, the one or more encoding pipeline further comprises a first encoding pipeline to process a first video frame, or portion thereof, immediately preceding the current video frame, and a second encoding pipeline to process a third video frame immediately preceding the second video frame. The buffer fullness update module further includes logic to update the buffer fullness based on a function of a difference between an actual and an estimated bitrate for the second video frame and a difference between the estimated bitrate for the first video frame and an average bitrate.

In furtherance of the first embodiments, the rate controller further includes logic to determine the target bitrate for the current video frame in a manner dependent upon both the current frame type and the prior frame type.

In one or more second embodiments, a video encoder includes one or more encoding pipeline to process a prior video frame, or portion thereof, and to generate one or more intermediate parameters indicative of the encode process. The video encoder further includes an additional encoding pipeline to encode a current video frame, or portion thereof, wherein the additional encoding pipeline includes a rate controller with a means to estimate a bitrate for the prior video frame based at least in part on the one or more intermediate parameters, update a buffer fullness based at least in part on the bitrate estimate, and determine a target bitrate for the current video frame based at least in part on the bitrate and estimate and the buffer fullness update.

In one or more third embodiments, a computer-implemented method for parallel video encoding includes processing one or more prior video frame, or portion thereof, through one or more encoding pipeline and generating one or more intermediate parameter indicative of the processing. The method further includes processing a current video frame, or portion thereof, through another encoding pipeline, wherein processing the current video frame further comprises estimating a bitrate for the prior video frame based at least in part on the one or more intermediate parameters, updating a buffer fullness based at least in part on the bitrate estimate, and determining a target bitrate for the current video frame based at least in part on the bitrate estimate and the buffer fullness update.

In furtherance of the third embodiments immediately above, the estimating the bitrate of the prior frame is dependent on synchronization information indicative of the intermediate parameters available from the prior video frame processing.

In furtherance of the third embodiments immediately above, estimating the bitrate of the prior video frame further comprises estimating the first video frame bitrate based on the actual PD of the first video frame in response to the actual PD of the first video frame being available, and estimating the first video frame bitrate based on the estimated PD or the target bitrate associated with the first video frame in response to the actual PD of the first video frame being unavailable.

In furtherance of the third embodiments above, processing the one or more prior video frame further comprises processing a first video frame immediately preceding the current video frame, and processing a second video frame immediately preceding the first video frame. The first video frame bitrate is estimated as a function of at least one of: a first set of intermediate parameters comprising a target bitrate associated with the first video frame, an actual bitrate associated with the second video frame, and an estimated bitrate associated with the second video frame; a second set of intermediate parameters comprising an estimated prediction distortion (PD) associated with the first video frame and a quantization parameter (QP) value associated with the first video frame, a QP value associated with the second video frame, and the actual bitrate associated with the second video frame; a third set of intermediate parameters comprising an actual PD associated with the first video frame, actual PD associated with the second video frame, and the actual bitrate associated with the second video frame; or a fourth set of intermediate parameters comprising a statistic of quantization coefficients associated with the first video frame.

In furtherance of the third embodiments immediately above, the first video frame bitrate is estimated based on an estimated prediction distortion and a QP value associated with the first video frame, and an estimated prediction distortion, a QP value, and actual bitrate associated with the second video frame.

In furtherance of the third embodiments above, the first video frame bitrate is estimated based on a function of an actual prediction distortion, encoding mode, and motion vector estimation of the first video frame, actual prediction distortion of the second video frame, and actual bitrate of the second video frame.

In furtherance of the third embodiments above, processing the one or more prior video frame further comprises processing a first video frame immediately preceding the current video frame, and processing a second video frame immediately preceding the first video frame. Estimating the prior frame bitrate further comprises estimating the first video frame bitrate based at least in part on one or more intermediate parameters generated from the second video frame processing.

In furtherance of the third embodiments, the bitrate associated with the prior frame is estimated based at least in part on the prior frame type.

In furtherance of the third embodiments immediately above, processing the prior video frame further comprises processing a first video frame immediately preceding the current video frame, and processing a second video frame immediately preceding the first video frame. The first video frame bitrate is estimated as the target bitrate in response to the first frame being a first intra frame, or in response to the second video frame being an intra-frame, scene change frame, or golden frame.

In furtherance of the third embodiments, processing the prior video frame further comprises processing a first video frame immediately preceding the current video frame, and processing a second video frame immediately preceding the first video frame. The buffer fullness is updated based on a function of a difference between an actual and an estimated bitrate for the second video frame and a difference between the estimated bitrate for the first video frame and an average bitrate.

In furtherance of the third embodiments, determining the target bitrate for the current video frame is dependent upon both the current frame type and the prior frame type.

In one or more fourth embodiments, one or more machine-readable medium having a plurality of instructions stored thereon which, when executed on a computing device, cause the computing device to perform any one of the third embodiments.

In one or more fourth embodiments, one or more machine-readable medium having a plurality of instructions stored thereon which, when executed on a computing device, cause the computing device to perform a method of parallel video coding, comprising processing one or more prior video frame, or portion thereof, through one or more encoding pipeline and generating one or more intermediate parameter indicative of the processing, and processing a current video frame, or portion thereof, through another encoding pipeline. Processing the current video frame further comprises estimating a bitrate for the prior video frame based at least in part on the one or more intermediate parameters, updating a buffer fullness based at least in part on the estimated bitrate, and determining a target bitrate for the current video frame based at least in part on the bitrate estimate and the buffer fullness update.

In furtherance of the fifth embodiments immediately above, the media further including instructions stored thereon, which, when executed by the computing device, cause the device to perform the method further comprising processing a first video frame immediately preceding the current video frame, and processing a second video frame immediately preceding the first video frame. The instructions further cause the processor to estimate the first video frame bitrate as a function of at least one of: a first set of intermediate parameters comprising a target bitrate associated with the first video frame, an actual bitrate associated with the second video frame, and an estimated bitrate associated with the second video frame; a second set of intermediate parameters comprising an estimated prediction distortion (PD) associated with the first video frame and a quantization parameter (QP) value associated with the first video frame, a QP value associated with the second video frame, and the actual bitrate associated with the second video frame; a third set of intermediate parameters comprising an actual PD associated with the first video frame, actual PD associated with the second video frame, and the actual bitrate associated with the second video frame; or a fourth set of intermediate parameters comprising a statistic of quantization coefficients associated with the first video frame.

It will be recognized that the embodiments are not limited to the exemplary embodiments so described, but can be practiced with modification and alteration without departing from the scope of the appended claims. For example, the above embodiments may include specific combination of features. However, the above embodiments are not limited in this regard and, in embodiments, the above embodiments may include the undertaking only a subset of such features, undertaking a different order of such features, undertaking a different combination of such features, and/or undertaking additional features than those features explicitly listed. Scope should, therefore, be determined with reference to the appended claims, along with the full scope of equivalents to which such claims are entitled.

What is claimed is:

1. A computer-implemented method for parallel video encoding, the method comprising:
   processing a first video frame immediately preceding a current video frame, and a second video frame immediately preceding the first video frame, through one or more first encoding pipelines and generating intermediate parameters indicative of the processing, wherein the intermediate parameters comprise a first quantization parameter (QP) value, and at least one of an estimated prediction distortion (PD) and an actual PD associated with the encoding of the first video frame, and wherein the intermediate parameters further comprise an actual bitrate, an estimated bitrate, and a second QP value associated with encoding the second video frame; and
   processing the current video frame through a second encoding pipeline, wherein the processing of the current video frame further comprises:
      selecting the estimated PD or actual PD associated with the encoding of the first video frame based on synchronization information indicative of an availability of the estimated or actual PD from the first video frame processing;
      estimating a bitrate for the first video frame based, at least in part, on the first and second QP values, and the selected estimated or actual PD;
      updating a buffer fullness based, at least in part, on the bitrate estimate for the first video frame, the actual and the estimated bitrates for the second video frame; and
      determining a target bitrate for the current video frame based, at least in part, on the bitrate estimate for the first video frame and the buffer fullness update.

2. The method of claim 1, wherein the first video frame bitrate is estimated as a further function of at least one of:
   a frame type of the first video frame;
   a PD associated with the second video frame; or
   a statistic of quantization coefficients associated with the first video frame.

3. The method of claim 2, wherein the first video frame bitrate is estimated based on a function of the first QP value and the estimated PD, and wherein the first video frame bitrate is estimated is based on an estimated PD, the second QP value, and the actual bitrate associated with the second video frame.

4. The method of claim 2, wherein the first video frame bitrate is estimated based on a function of the actual PD, encoding mode, and motion vector estimation associated with the encoding of the first video frame, actual PD of the second video frame, and actual bitrate of the second video frame.

5. The method of claim 2, wherein estimating the bitrate of the first video frame further comprises:
   estimating the first video frame bitrate based on the actual PD of the first video frame in response to synchronization information indicative of the actual PD of the first video frame being available; and
   estimating the first video frame bitrate based on the estimated PD or the target bitrate associated with the first video frame in response to synchronization information indicative of the actual PD of the first video frame being unavailable.

6. The method of claim 1, wherein the bitrate associated with the first frame is estimated based at least in part on a frame type of the first frame.

7. The method of claim 6, wherein the estimate of the first video frame bitrate is the target bitrate in response to the first frame being a first intra frame, or in response to the second video frame being an intra-frame, scene change frame, or golden frame.

8. The method of claim 1, wherein the buffer fullness is updated based on a function comprising a difference between the actual and the estimated bitrates for the second video frame and comprising a difference between the estimated bitrate for the first video frame and an average bitrate.

9. The method of claim 1, wherein determining the target bitrate for the current video frame is dependent upon both a frame type of the current frame and a frame type of the first frame.

10. One or more non-transitory machine-readable media having a plurality of instructions stored thereon which, when executed on a computing device, cause the computing device to perform a method of parallel video coding, comprising:
   processing a first video frame immediately preceding a current video frame, and a second video frame immediately preceding the first video frame, through one or more first encoding pipelines and generating intermediate parameters indicative of the processing, wherein the intermediate parameters comprise a first quantization parameter (QP) value, and at least one of an estimated prediction distortion (PD) and an actual PD associated with the encoding of the first video frame, and wherein the intermediate parameters further comprise an actual bitrate, an estimated bitrate, and a second QP value associated with encoding the second video frame; and
   processing the current video frame, or portion thereof, through a second encoding pipeline, wherein the processing of the current video frame further comprises:
      selecting the estimated PD or actual PD associated with the encoding of the first video frame based on synchronization information indicative of an availability of the estimated or actual PD from the first video frame processing;
      estimating a bitrate for the first video frame based, at least in part, on the first and second QP values, and the selected estimated or actual PD;
      updating a buffer fullness based at least in part on the estimated bitrate for the first video frame, the actual and the estimated bitrates for the second video frame; and determining a target bitrate for the current video frame based, at least in part, on the bitrate estimate for the first video frame and the buffer fullness update.

11. The media of claim 10, wherein the first video frame bitrate is estimated as a further function of at least one of:
   a frame type of the first video frame;
   a PD associated with the second video frame; or
   a statistic of quantization coefficients associated with the first video frame.

12. An apparatus for parallel video encoding, the apparatus comprising:
   a memory to store a current video frame, a first video frame immediately preceding the current video frame, and a second video frame immediately preceding the first video frame; and
   a processor coupled to the memory, the processor to:
      process the first and second video frames through a first encoding pipeline and generate intermediate parameters indicative of the processing, wherein the intermediate parameters comprise a first quantization parameter (QP) value, and at least one of an estimated prediction distortion (PD) and an actual PD associated with the encoding of the first video frame, and wherein the intermediate parameters further comprise an actual bitrate, an estimated bitrate, and a second QP value associated with encoding the second video frame;
      process the current video frame through a second encoding pipeline, wherein to process the current video frame, the processor is to:
         select the estimated PD or actual PD associated with the encoding of the first video frame based on synchronization information indicative of an availability of the estimated or actual PD from the first video frame processing;
         estimate of a bitrate for the first video frame based, at least in part, on the first and second QP values, and the selected estimated or actual PD;
         update to a buffer fullness based at least in part on the bitrate estimate for the first video frame, the actual and the estimated bitrates for the second video frame; and
         determine a target bitrate for the current video frame based at least in part on the bitrate estimate for the first video frame and the buffer fullness update.

13. The apparatus of claim 12, wherein the first video frame bitrate is an estimate that is a further function of at least one of:

a frame type of the first video frame;
a PD associated with the second video frame; or
a statistic of quantization coefficients associated with the first video frame.

14. The apparatus of claim 13, wherein the first video frame bitrate is an estimate based on the estimated PD and the first QP value, and wherein the first video frame bitrate is an estimate based on an estimated PD, the second QP value, and actual bitrate associated with the second video frame.

15. The apparatus of claim 13, wherein the first video frame bitrate is an estimate based on a function of the actual PD, encoding mode, and motion vector estimation associated with the encoding of the first video frame, actual PD of the second video frame, and actual bitrate of the second video frame.

16. The apparatus of claim 13, wherein the estimate of the bitrate of the first video frame further comprises:
   an estimate of the first video frame bitrate that is based on the actual PD of the first video frame in response to synchronization information indicative of the actual PD of the first video frame being available; and
   an estimate of the first video frame bitrate that is based on the estimated PD or the target bitrate associated with the first video frame in response to synchronization information indicative of the actual PD of the first video frame being unavailable.

17. The apparatus of claim 12, wherein the estimate of the bitrate associated with the first frame is based at least in part on a frame type of the first frame.

18. The apparatus of claim 17, wherein:
   the estimate of the first video frame bitrate is the target bitrate in response to the first frame being a first intra frame, or in response to the second video frame being an intra-frame, scene change frame, or golden frame.

19. The apparatus of claim 12, wherein:
   the processor to process the current video frame is to update the buffer fullness based on a function comprising a difference between an actual and an estimated bitrate for the second video frame and comprising a difference between the estimated bitrate for the first video frame and an average bitrate.

20. The apparatus of claim 12, wherein the target bitrate for the current video frame is dependent upon a frame type of the current frame and a frame type of the first frame.

* * * * *